United States Patent
Gisquet

(10) Patent No.: US 12,537,951 B2
(45) Date of Patent: Jan. 27, 2026

(54) METHOD FOR IMAGE PROCESSING AND APPARATUS FOR IMPLEMENTING THE SAME

(71) Applicant: ATEME, Velizy Villacoublay (FR)

(72) Inventor: Christophe Gisquet, Acigne (FR)

(73) Assignee: ATEME, Velizy Villacoublay (FR)

( * ) Notice: Subject to any disclaimer, the term of this patent is extended or adjusted under 35 U.S.C. 154(b) by 518 days.

(21) Appl. No.: 17/975,904

(22) Filed: Oct. 28, 2022

(65) Prior Publication Data

US 2023/0136458 A1     May 4, 2023

(30) Foreign Application Priority Data

Oct. 29, 2021 (EP) .................................... 21306530

(51) Int. Cl.
| | | |
|---|---|---|
| *H04N 19/12* | (2014.01) | |
| *H04N 19/124* | (2014.01) | |
| *H04N 19/176* | (2014.01) | |
| *H04N 19/18* | (2014.01) | |
| *H04N 19/625* | (2014.01) | |

(52) U.S. Cl.
CPC ........... *H04N 19/12* (2014.11); *H04N 19/124* (2014.11); *H04N 19/176* (2014.11); *H04N 19/18* (2014.11); *H04N 19/625* (2014.11)

(58) Field of Classification Search
CPC .. H04N 19/176; H04N 19/159; H04N 19/105; H04N 19/44; H04N 19/117; H04N 19/593; H04N 19/46; H04N 19/70; H04N 19/61; H04N 19/139; H04N 19/51; H04N 19/50; H04N 19/463
See application file for complete search history.

(56) References Cited

U.S. PATENT DOCUMENTS

2016/0219290 A1* 7/2016 Zhao ..................... H04N 19/167
2021/0120269 A1   4/2021 Chen et al.

OTHER PUBLICATIONS

Chen et al., "Algorithm description for Versatile Video Coding and Test Model 12 (VTM 12)," Joint Video Experts Team (JVET) of ITU-T SG 16 WP 3 and ISO/IEC JTC 1/SC 29/WG 11, 21st Meeting: Teleconference, Jan. 6-15, 2021, Document JVET-V2002-v1, 2021, 104 pages.

Choi et al., "CE-6 related: Simplification on MTS kernel derivation," 124 MPEG Meeting, Oct. 8-12, 2018, No. m44065, Oct. 3, 2018, retrieved from internet: http://phenix/int-evry.fr/mpeg/doc_end_user/documents/124_Macao/wg11/m44065-JVET-L0059-v2-JVET-L0059_v2.zip JVET-L0059_v2.docx (retrieved on Oct. 3, 2018), 4 pages.

(Continued)

*Primary Examiner* — Farhan Mahmud
(74) *Attorney, Agent, or Firm* — Faegre Drinker Biddle & Reath LLP

(57) ABSTRACT

A method of processing an image, wherein the image is divided into a plurality of blocks is provided, which comprises, for a block of the plurality of blocks: determine prediction residual data representing prediction encoding data for pixels of the block; determine coefficients based on the prediction residual data; based on a number of non-null coefficients among the coefficients, the number of non-null coefficients being at least one, determine a processing to be performed on the prediction residual data for generating a binary flow of encoded pixels of the block.

20 Claims, 8 Drawing Sheets

(56) References Cited

OTHER PUBLICATIONS

De Rivaz et al., "AV1 Bitsteam & Decoding Process Specification," 2018, https://aomediacodec.github.io/av1-spec/av1-spec.pdf, 681 pages.
Han et al, "A Technical Overview of AV1," 2020, https://arxiv.org/abs/2008.06091, pp. 1-25.
International Telecommunication Union, "Transmission of Non-Telephone Signals. Information Technology—Generic Coding of Moving Pictures and Associated Audio Information: Video," Recommendation ITU-T H.262, ISO/CEI 13818-2, 1994, 211 pages.
International Telecommunication Union, "Series H: Audiovisual and Multimedia Systems. Infrastructure of Audiovisual Services—Coding of moving video. Advanced video coding for generic audiovisual services," Recommendation ITU-T H.264, ISO/IEC 14496-10: 2014, 2014, 790 pages.
International Telecommunication Union, "Series H: Audiovisual and Multimedia Systems. Infrastructure of Audiovisual Services—Coding of moving video. High efficiency video coding," Recommendation ITU-T H.265, ISO/IEC 23008-2:2015, 2015, 634 pages.
International Telecommunication Union, "Series H: Audiovisual and Multimedia Systems. Infrastructure of Audiovisual Services—Coding of moving video. Versatile video coding," Recommendation ITU-T H.266, ISO/IEC 23090-3, 2020, 516 pages.
Stankowski et al., "Rate-Distortion Optimized Quantization in HEVC: Performance Limitations," Conference Paper, PCS2015, Jun. 2015, https://www.researchgate.net/publication/279183792_Rate-distortion_optimized_quantization_in_HEVC_Performance_limitations, 6 pages.
Search Report issued in related application EP 21306530.Jul. 3, 12, 2022, 12 pages.

\* cited by examiner

METHOD FOR IMAGE PROCESSING AND APPARATUS FOR IMPLEMENTING THE SAME

CROSS-REFERENCE TO RELATED APPLICATIONS

This application claims priority benefit under 35 U.S.C. § 119(d) from European Patent Application No. 21 306 530.3, filed Oct. 29, 2021, the disclosure of which is incorporated by reference herein in its entirety.

FIELD

The present disclosure relates to the field of image processing, in particular for image encoding for video stream compression.

BACKGROUND

Video data is often source encoded so as to decrease the amount of resources necessary for its transmission and/or storage in memory. Various video coding or compression standards that have been developed over the recent years, such as H.264/AVC, H.265/HEVC or MPEG-2, may be used for that purpose.

In known video coding or compression schemes, images (also referred to as "frames") of an input video stream to be encoded are typically processed according to an image encoding sequence, and each image is divided into pixel sets (also referred to as, depending on the scheme, "blocks" or "coding unit") which are also processed sequentially, for example starting from the set located in the upper left corner of the image, and ending with the set located in the lower right corner of the image.

The encoding of an image of an input video stream may therefore involve dividing a pixel matrix corresponding to the image into several pixel sets, for example into blocks of a fixed size (16×16 pixels, 32×32 pixels, or 64×64 pixels), and encoding these pixel blocks according to a predefined encoding sequence. In some standards, such as H.264/AVC, blocks smaller than 16×16 pixels may be defined (for example of size 8×8 pixels or 4×4 pixels) so as to perform encoding of the image with a finer granularity.

Conventional video compression schemes can be classified into two main categories: an intra prediction video coding category on the one hand, and an inter prediction video coding category on the other hand. In intra prediction video coding, also referred to as spatial prediction video coding, the compression processing uses for the prediction spatial redundancies based on pixels of the current image or video frame, while in inter prediction video coding, also referred to as temporal prediction video coding, the compression processing uses for the prediction temporal redundancies based on pixels of several images or video frames (previously encoded and reconstructed video frames, which may correspond to previous and/or future frames with respect to a current frame in an input video sequence). More specifically, in intra prediction video coding, the processing of a pixel block (or set of pixels) typically includes a prediction of the pixels of the block based on reconstructed pixels that have been previously encoded (also called "causal pixels") in the image currently being encoded (which may be referred to as "current image"). In inter prediction video coding, the processing of a pixel block typically includes a prediction of the pixels of the block based on pixels of one or more previously encoded images.

Exploiting the spatial redundancies (for intra prediction video coding) and/or time redundancies (for inter prediction video coding) is therefore performed to avoid transmitting or storing the pixel values of each pixel block (or set of pixels), and at least some of the blocks of each encoded image in a video stream is represented by a pixel residual that corresponds to the difference (or the distance) between prediction values and true values for the pixels of the predicted block. Information related to pixel residuals is inserted in the encoded data generated by a video encoder after transform (e.g. Discrete Cosine Transform, DCT) and quantization so as to reduce the entropy of data generated by the encoder.

The transform and quantization performed on the pixel residual data may each be selected based on one or more selection criteria, for example in order to optimize the compression rate or encoding speed. Various transforms and/or quantization schemes may be predefined, so that a transform and/or quantization considered optimum may be selected. A number of transforms and/or quantization schemes may be tested in order to make such selection, which may be computationally expensive and/or generate a computational delay, which may be detrimental to or incompatible with a desired compression rate, encoding gain or compression throughput.

SUMMARY

Based on the issues described in the Background, it is desirable, in particular to provide an improved image processing scheme and apparatus implementing the same that address at least some of the above-described drawbacks and shortcomings of the conventional technology in the art.

It is an object of the present subject disclosure to provide an improved image processing scheme and apparatus implementing the same.

Another object of the present subject disclosure is to provide an improved video encoding or compression scheme and apparatuses implementing the same.

Another object of the present subject disclosure is to provide an improved video encoding scheme and apparatuses implementing the same for alleviating the above-described drawbacks and shortcomings of conventional prediction-based video encoding schemes.

To achieve these objects and other advantages and in accordance with the purpose of the present subject disclosure, as embodied and broadly described herein, in one aspect of the present subject disclosure, a method of processing an image, a digital video frame, or more generally digital video data, divided into a plurality of (pixel) blocks is proposed. The method comprises, for a pixel block of the plurality of pixel blocks: determining prediction residual data representing prediction encoding data for pixels of the block, determining coefficients based on the prediction residual data, and based on a number of non-null coefficients among the coefficients, the number of non-null coefficients being at least one, determine a processing to be performed on the prediction residual data for generating a binary flow of encoded pixels of the block.

The proposed method provides a criterion for determining a processing operation of an image that advantageously allows improving the selection of a processing operation which is considered optimum based on one or more certain criteria, e.g. increasing the speed of selecting the optimum processing operation.

In one or more embodiments, the coefficients are determined by performing a transform on the prediction residual data and the processing comprises a transform of the prediction residual data, or the coefficients are determined by performing quantization on transformed prediction residual data and the processing comprises a quantization of transformed prediction residual data.

In one or more embodiments, the proposed method further comprises: determine image processing context data based on a context for processing the image; determine a threshold based on the image processing context data; wherein the processing is determined based on a comparison of the number of non-null coefficients with the threshold.

In one or more embodiments, the determining of the coefficients comprises: determine first transform coefficients by applying a first transform to the prediction residual data, and the determining the processing comprises: based on a first number of non-null transform coefficients among the first transform coefficients being at least one, select a transform to be performed on the prediction residual data for generating a binary flow of encoded pixels of the block.

In one or more embodiments, the proposed method further comprises: based on the first number of non-null transform coefficients being smaller than a first transform coefficient threshold, use the first transform coefficients for generating transformed prediction residual data.

In one or more embodiments, the proposed method further comprises: based on the first number of non-null transform coefficients being greater than or equal to the first transform coefficient threshold and smaller than a second transform coefficient threshold, test transforms in a predefined first set of transforms, and select the transform to be performed on the prediction residual data for generating a binary flow of encoded pixels of the block among the first transform and transforms of the first set of transforms.

In one or more embodiments, the proposed method further comprises: based on the first number of non-null transform coefficients being greater than a third transform coefficient threshold, test transforms in a predefined second set of transforms, and select the transform to be performed on the prediction residual data for generating a binary flow of encoded pixels of the block among the first transform and transforms of the second set of transforms, wherein the second set of transforms comprise an identity transform.

In one or more embodiments, the proposed method further comprises: perform at least one iteration of a transform test loop, an $N^{th}$ iteration of the transform test loop comprising, N being a transform test loop counter initialized to one: determine $N^{th}$ test loop transform coefficients by applying an $N^{th}$ test loop transform to the prediction residual data, wherein the transform to be used for generating a binary flow of encoded pixels of the block is further based on an $N^{th}$ number of non-null test loop transform coefficients among the $N^{th}$ test loop transform coefficients, the $N^{th}$ number of non-null test loop transform coefficients being at least one, and wherein the $N^{th}$ transform is of a type different from a type of the first transform and a type of the $i^{th}$ transform used during any previous iteration of the transform test loop.

In such embodiments, the proposed method may further comprise: based on each of the first number of the non-null coefficients and the $N^{th}$ number of the non-null test loop transform coefficients being smaller than the first transform coefficient threshold, select the transform to be performed on the prediction residual data for generating a binary flow of encoded pixels of the block in a set of tested transforms comprising the first transform and transforms used during executed iterations of the transform test loop.

In such embodiments, the proposed method may further comprise: based on each of the first number of the non-null coefficients and the $N^{th}$ number of the non-null test loop transform coefficients not being smaller than the first transform coefficient threshold, performing an additional iteration of the transform test loop.

In one or more embodiments, the first transform may be a bi-dimensional Direct Cosine Transform, DCT, transform.

In one or more embodiments, the determining of the coefficients comprises: determine first quantized coefficients by performing a first quantization of transformed prediction residual data, and the determining the processing comprises: based on a first number of non-null quantized coefficients among the first quantization coefficients being at least one, determine a quantization to be performed on transformed prediction residual data for generating a binary flow of encoded pixels of the block.

In such embodiments, the proposed method may further comprise: based on the first number of non-null quantized coefficients being smaller than a quantization configuration threshold, select a quantization algorithm to be used for generating the binary flow of encoded pixels of the block in a set of one or more predefined quantization algorithms.

In such embodiments, the proposed method may further comprise: based on the first number of non-null quantization coefficients being smaller than a quantization coefficient threshold, use the first quantization coefficients for generating the binary flow of encoded pixels of the block.

In another aspect of the present subject disclosure, an apparatus is proposed, which comprises a processor, and a memory operatively coupled to the processor, wherein the image processing apparatus is configured to perform a method according to an embodiment proposed in the present subject disclosure.

In yet another aspect of the present subject disclosure, a non-transitory computer-readable medium encoded with executable instructions which, when executed, causes an apparatus comprising a processor operatively coupled with a memory, to perform a method according to an embodiment proposed in the present subject disclosure, is proposed.

For example, in embodiments, the present subject disclosure provides a non-transitory computer-readable medium encoded with executable instructions which, when executed, causes an apparatus comprising a processor operatively coupled with a memory, to, for a block of a plurality of blocks into which the image is divided, determine, via the processor, prediction residual data representing prediction encoding data for pixels of the block, determine, via the processor, coefficients based on the prediction residual data, and based on a number of non-null coefficients among the coefficients, the number of non-null coefficients being at least one, determine, via the processor, a processing to be performed on the prediction residual data for generating a binary flow of encoded pixels of the block.

In yet another aspect of the present subject disclosure, a computer program product comprising computer program code tangibly embodied in a computer readable medium, said computer program code comprising instructions to, when provided to a computer system and executed, cause said computer to perform a method according to an embodiment proposed in the present subject disclosure, is proposed.

In another aspect of the present subject disclosure, a data set representing, for example through compression or encoding, a computer program as proposed herein, is proposed.

It should be appreciated that the present subject disclosure can be implemented and utilized in numerous ways, including without limitation as a process, an apparatus, a system, a device, and as a method for applications now known and later developed. These and other unique features of the system disclosed herein will become more readily apparent from the following description and the accompanying drawings.

BRIEF DESCRIPTION OF THE DRAWINGS

The present subject disclosure will be better understood and its numerous objects and advantages will become more apparent to those skilled in the art by reference to the following drawings, in conjunction with the accompanying specification, in which.

DETAILED DESCRIPTION

Figure 1:
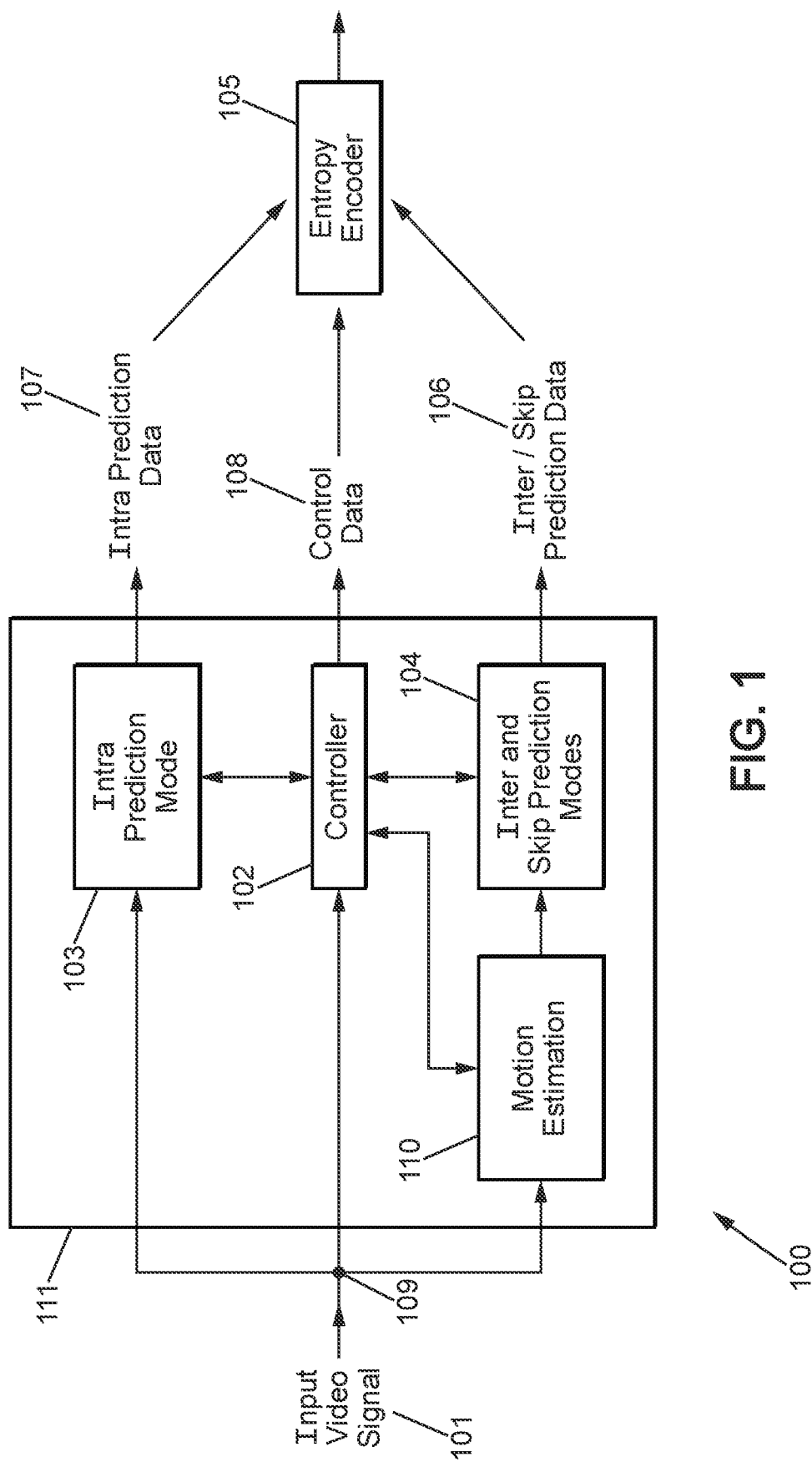
FIG. 1 shows a block diagram illustrating an exemplary video encoder on which the proposed method may be implemented in accordance with one or more embodiments.

For simplicity and clarity of illustration, the drawing figures illustrate the general manner of construction, and descriptions and details of well-known features and techniques may be omitted to avoid unnecessarily obscuring the discussion of the described embodiments of the present subject disclosure. Additionally, elements in the drawing figures are not necessarily drawn to scale. For example, the dimensions of some of the elements in the figures may be exaggerated relative to other elements to help improve understanding of embodiments of the present subject disclosure. Certain figures may be shown in an idealized fashion in order to aid understanding, such as when structures are shown having straight lines, sharp angles, and/or parallel planes or the like that under real-world conditions would likely be significantly less symmetric and orderly. The same reference numerals in different figures denote the same elements, while similar reference numerals may, but do not necessarily, denote similar elements.

In addition, it should be apparent that the teaching herein can be embodied in a wide variety of forms and that any specific structure and/or function disclosed herein is merely representative. In particular, one skilled in the art will appreciate that an aspect disclosed herein can be implemented independently of any other aspects and that several aspects can be combined in various ways.

The present disclosure is described below with reference to units, modules, features, functions, engines, block diagrams and flowchart illustrations of the methods, systems, and computer program according to one or more exemplary embodiments. Each described unit, module, feature, function, engine, block of the block diagrams and flowchart illustrations can be implemented in hardware, software, firmware, middleware, microcode, or any suitable combination thereof. If implemented in software, the functions, engines, blocks of the block diagrams and/or flowchart illustrations can be implemented by computer program instructions or software code, which may be stored or transmitted over a computer-readable medium, or loaded onto a general purpose computer, special purpose computer or other programmable data processing apparatus to produce a machine, such that the computer program instructions or software code which execute on the computer or other programmable data processing apparatus, create the means for implementing the functions described herein.

Embodiments of computer-readable media includes, but are not limited to, both computer storage media and communication media including any medium that facilitates transfer of a computer program from one place to another. As used herein, a "computer storage media" may be any physical media that can be accessed by a computer or a processor. In addition, the terms «memory» and «computer storage media» include any type of data storage device, such as, without limitation, a hard drive, a flash drive or other flash memory devices (e.g. memory keys, memory sticks, key drive), CD-ROM or other optical storage, DVD, magnetic disk storage or other magnetic storage devices, memory chip(s), Random Access Memory (RAM), Read-Only-Memory (ROM), Electrically-erasable programmable read-only memory (EEPROM), smart cards, or any other suitable medium that can be used to carry or store program code in the form of instructions or data structures which can be read by a computer processor, or a combination thereof. Also, various forms of computer-readable media may transmit or carry instructions to a computer, including a router, gateway, server, or other transmission device, wired (coaxial cable, fiber, twisted pair, DSL cable) or wireless (infrared, radio, cellular, microwave). The instructions may comprise code from any computer-programming language, including, but not limited to, assembly, C, C++, Python, Visual Basic, SQL, PHP, and JAVA.

Unless specifically stated otherwise, it will be appreciated that throughout the following description discussions utilizing terms such as processing, computing, calculating, determining, or the like, refer to the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system.

The terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

Additionally, the word "exemplary" is used herein to mean "serving as an example, instance, or illustration". Any embodiment or design described herein as "exemplary" is not necessarily to be construed as preferred or advantageous over other embodiments or designs.

The terms "operationally coupled", "coupled", "mounted", "connected" and their various variants and forms used in the present description refer to couplings, connections and mountings that may be direct or indirect, and comprise in particular connections between electronic equipment or between portions of such equipment that allow operations and modes of operation as described in the present description. In addition, the terms "connected" and "coupled" are not limited to physical or mechanical connections or couplings. For example, an operational coupling may include one or more wired connection(s) and/or one or more wireless connection(s) between two or more items of equipment that allow simplex and/or duplex communication links between the equipment or portions of the equipment. According to another example, an operational coupling or a connection may include a wired-link and/or wireless coupling for allowing data communications between a server of the proposed system and another item of equipment of the system.

As used herein, the term "pixel" means a picture element or an elementary component of an image, a color component image, or a (luma or chroma) channel type image, and data corresponding thereto, which may be represented by a numeric value, e.g. a natural integer value. A pixel of a digital image may be coded digitally, and its value may be coded into a bitstream. Further, a pixel of an image may represent image data according to color spaces, such as the Y, Cb and Cr color spaces, wherein Y is a luma component of the pixel (also called in the present subject disclosure a luma pixel, a luma sample, or for the sake of simplicity a pixel), and $C_b$ and $C_r$ are the blue-difference and red-difference chroma components of the pixel (also called in the present subject disclosure a chroma pixel, a chroma sample, or for the sake of simplicity a pixel). Two channel types may also be distinguished for a pixel: a luma channel type, corresponding to the luma component of the pixel, and a chroma channel type, jointly designating the chroma components of the pixel. The chroma channel type pixel may itself be divided into the blue-difference (Cb) chroma component and the red-difference (Cr) chroma component. In the following, the term "pixel" may be used to refer, depending on the embodiment and on the image to which it pertains (which may be a YCbCr image, a component image, a chroma component image, a luma component image, etc.), to a pixel of an original image, a luma channel pixel, a chroma channel pixel, a Cb pixel, a Cr pixel, a chroma component pixel, a luma component pixel, a chroma sample, a luma sample, etc., or any combination of the above.

In the following, the term "plane" may be used to refer to, depending on the embodiment, a color space, a channel type, or a component of the pixel to which all or part of the proposed method may be applied. For example, processing a pixel in the luma plane may correspond to processing a luma component of the pixel (typically associated with a so-called "luminance plane", referred to as the "Y" plane), while processing the pixel in a chroma plane may correspond to processing a chroma component of the pixel (two chrominance planes being generally used and referred to as the "U" and "V" planes, or "Cb" and "Cr" planes). In the following, unless stated otherwise, an operation described as applicable to a pixel may be applied to any pixel component, whether chroma or luma, that is, regardless of whether the pixel represents a luma component or a chroma component of a three-color component pixel. In the following, some embodiments of the proposed methods, apparatuses and computer programs are described for the exemplary processing of pixels of an image in the Y, Cb, and/or Cr planes. However, it will be appreciated by those having ordinary skill in the relevant art that other color spaces, such as, for example, the YUV, Y'CbCr, or RGB color spaces, may be used in place of or in addition to the set of YCbCr color spaces, which is given by way of example only according to embodiments of the present subject disclosure.

The methods proposed in the present subject disclosure may be implemented by any video encoder, or video codec configured for encoding images (or frames) of input video data using predictive coding, such as, for example a video encoder compliant with any of the H.261, MPEG-1 Part 2, H.262, MPEG-2 Part 2, Alliance for Open Media (AOM) AV1, H.264/AVC, H.265/HEVC, MPEG-4 Part 2, SHVC (Scalable HEVC), H.266/VVC, and MPEG-5 EVC specifications or standards, whether in their existing versions and/or their evolutions, as the case may be adapted for implementing one or more embodiments of the proposed methods.

Shown on FIG. 1 is a video encoder 100 that receives at input interface 109 an input video stream 101 that includes a plurality of images (or frames) to be processed for the encoding of the input video stream. The video encoder includes a controller 102, operatively coupled with the input interface 109, configured for controlling the operations of a motion estimation unit 110 and an inter prediction encoding unit 104, as well as an intra prediction encoding unit 103. Data received on the input interface 109 are transmitted to the motion estimation unit 110, to the inter prediction encoding unit 104, to the intra prediction encoding unit 103, and to the controller 102. Together with the controller 102, the motion estimation unit 110, the inter prediction encoding unit 104, and the intra prediction encoding unit 103 form an encoding unit 111 which is operatively coupled to the input interface 109.

The intra prediction encoding unit 103 generates intra prediction data 107 which are inputted to an entropy encoder 105. The motion estimation unit 110 generates motion estimation data 106 which are provided to the controller 102 as well as to the inter prediction encoding unit 104 for inter prediction encoding. The inter prediction encoding unit 104 generates inter prediction data which are inputted to the entropy encoder 105. For example, in some embodiments, data provided to the decoder for an inter prediction encoding may include prediction pixel residuals and information related to one or more motion vectors. Such information related to one or more motion vectors may include one or more indices that each identifies a prediction vector in a list of prediction vectors known to the decoder. Data provided to the decoder for a skip prediction mode may typically not include any pixel residual, and may also include one or more indices that each identifies a prediction vector in a list of prediction vectors known to the decoder. The list of prediction vector used for inter prediction encoding may not be identical to the list of prediction vectors used for skip prediction encoding.

The controller 102 generates control data which may also be provided as input data to the entropy encoder 105.

In one or more embodiments, an image undergoing processing is typically divided into blocks or coding units, the form and size of which may be determined based on the size of the pixel matrix that corresponds to the image, for example into square-shaped macroblocks of size 16×16 pixels. These blocks can form a set of blocks, corresponding to a partition of the image, for which a processing sequence may be defined that represents the order in which the blocks of the set are to be processed (e.g., encoded or compressed). In the exemplary case of square-shaped blocks of equal sizes, the processing sequence may define a processing order according to which the block located at the leftmost upper corner of the pixel matrix is processed first, followed by the block located immediately to the right of the previous block, until the block at the end of the upper line of blocks (that is, the block located at the rightmost upper corner of the pixel matrix) is processed, followed by the block located at the leftmost on the line immediately below the upper line of blocks, followed by the blocks of this second line processed from left to right, and so on until the block located at the rightmost lower corner of the pixel matrix, which is processed last.

One may therefore consider a so-called "current block," that is, a block being under processing in the current image. In some embodiments, the processing of the current block may include subdividing the current block into sub-blocks, so that the block may be processed with a finer spatial granularity. The processing of a block may also include a predicting of the pixels of the block, using spatial correlations (within the same image) or temporal correlations (in previously processed images) among pixels. In embodiments where a plurality of prediction types may be used, such as an intra prediction, an inter prediction, and/or a skip prediction, implemented in the encoder, the prediction of the block pixels typically includes a selection of a prediction type, and the generation of prediction data that correspond to the selected prediction type, which may form, together with prediction type selection data, a set of encoding parameters.

A video encoder using prediction coding, whether spatial prediction coding (e.g. intra prediction) or temporal prediction coding (e.g. inter or skip prediction), will typically include a decoder unit, or pixel reconstruction unit (not represented on FIG. 1), configured for generating reconstructed pixels, from the reconstructing of pixels that have been encoded, which reconstructed pixels are used for the prediction of pixels of a current block (i.e. pixels of a block being encoded).

In some embodiments, the prediction of the block under processing may comprise a calculation of prediction pixel residuals, which respectively correspond to a gap, or distance, or difference, between pixels of the current block and corresponding pixels of a prediction block. The prediction pixel residuals may be transmitted to the decoder in some embodiments after transform and quantization.

According to numerous video codec technical specifications, a transform operation is typically performed on the prediction pixel residuals in order to remove potential spatial correlations.

Different types of transform operation may be defined in the codec specification, and the transform to be performed may be selected in a set of predefined types of transform operation according to one or more suitable selection criteria.

For example, the HEVC codec specification provides that a Discrete Sine Transform (DST) type transform operation may be considered for processing prediction pixel residuals generated from spatial prediction coding (e.g. intra prediction). As spatial prediction coding tends to propagate causal edges (sometimes referred to as "boundaries") of the current block, because of the continuity of natural images, the magnitude of residuals increases as corresponding pixel is distant from these causal edges (or boundaries). Therefore, a DST-type transform is well suited for coding spatial prediction coding prediction pixel residuals.

As another example, the VP9 codec uses transform kernels, including 1-D discrete cosine transform (DCT) and asymmetric discrete sine transform (ADST) kernels that are combined to generate 2-D transforms, which can be selected based on the type of prediction coding applied to the current block. The AV1 codec specification also defines a plurality of transform kernels to be selected to construct the 2-D transform to be applied to a transform block of a given transform block size. A 2-D transform can be constructed by combining two transform kernels, each chosen in a set of kernels of the following four different transform types, depending on the size of the transform block: DCT, ADST, flipped ADST (FLIPADST), and identity transform (IDTX). For a given transform size, a 2-D transform may therefore be selected in a set of 16 combinations of 1-D kernels.

Likewise, a plurality of 1-D transform types has been defined for the H.266/VVC specifications, such as, for example, so-called "DCT-II," "DCT-VIII," and "DST-VII" transform types.

Codec specifications that provide for a selection of different possible 1-D transform types, such as the AV1 and VVC codec specifications, also define a signaling scheme for signaling the type of transform selected for each dimension (vertical and horizontal). As an example, the following table provides an example of such a signaling scheme that may be used for VVC:

TABLE 1

| | | | Intra/inter | |
|---|---|---|---|---|
| MTS_CU_flag | MTS_Hor_flag | MTS_Ver_flag | Horizontal | Vertical |
| 0 | | | DCT2 | |
| 1 | 0 | 0 | DST7 | DST7 |
| | 0 | 1 | DCT8 | DST7 |
| | 1 | 0 | DST7 | DCT8 |
| | 1 | 1 | DCT8 | DCT8 |

The sizes of transform blocks defined in a current block for performing the transform on the current block through applying a transform to each of the transport blocks of a current block may also be used, according to some codec specifications, as a parameter for selecting the transform coding to be applied to prediction residuals of the current block. Therefore, multiple transform block sizes and shapes may be used to perform transform coding.

For example, the AV1 codec specifies a maximum transform block size of 64×64, and a minimum transform block size of 4×4. Square and rectangular transform block shapes may also be used, depending on the shape of the current block being processed.

Codec specifications that provide for a selection of different possible transform block types (e.g. different transform block sizes and/or shapes), such as the AV1 and VVC codec specifications, also define a signaling scheme for signaling the type of transform block used for transform coding of the prediction residuals of the current block.

Transform coding of prediction residual data produces data sometimes referred to as "coefficients," which may be quantized in order to produce reduced magnitude integer levels respectively corresponding to the coefficients.

Video codec specifications typically define a quantization operation through the reverse quantization operation. The combination of the quantization operation and the corresponding reverse quantization operation may not be lossless, and as a consequence the reverse quantization operation may not produce the initial value on which the quantization operation was applied.

Various quantization parameters may be used to define a quantization operation, such as, for example, in video codec specifications.

For example, the VVC specification provides support for quantization operation. The core of this operation can be summarized by computations of the following exemplary type that use a frequency [x,y] and a quantization step (QP or qP) as parameters: obtaining a table of factors m[x][y] (which is sometimes referred to as a "quantization matrix" or a "scaling list"), and deriving the final factors ls[x][y] per frequency [x,y]:ls[x][y]=(m[x][y]*levelScale[parameters][qP %6])<<(qP/6). Each frequency level dz[x][y] is scaled into a scaled frequency level dnc[x][y]: dnc[x][y]=(dz[x][y]*levelScale[x][y]+dbOffset)>>bdShift.

Depending on the implementation, the m[x][y] table for a given transform size can for example be implicit (that is, not explicitly signaled to the decoder) and selected among a plurality of default tables. Alternatively, the m[x][y] table can be explicitly signaled, for example in a high-level syntax element, such as for example the Picture Parameter Set (PPS) or Sequence Parameter Set (SPS) in VVC. In all cases, the m[x][y] table is typically used to control how precisely high frequencies, which are costly to transmit, are encoded. The levelScale[x][y] table contains information describing the precision level used for encoding high frequencies.

The selection of parameters for determining the transform operation to be used on prediction residual data, and/or the quantization operation to be used on transformed coefficients, may typically be performed based on a selection criterion such as a cost optimization criterion. For example, a Lagrange rate-distortion (RD) optimization scheme may be used for determining parameters (for transform coding and/or quantization) that corresponds to a minimum distortion under a Rate constraint: a λ value may be defined (typically as a function of the image and the quantization step), and the optimum parameters that minimize a RD cost function criterion such as, for example, a cost function R+λ.D, may be selected for processing of the current block.

For example, the absolute value ABS of an input coefficient may be quantized into the following three different values respectively resulting from three available quantization schemes, among which one may be selected:

0: in such case no input coefficient;
(ABS+div/2)/div: rounded value to the nearest integer;
ABS/div: rounded value nearest to zero.

Each of these three values results in a corresponding rate R and a corresponding distortion value D (after reconstruction). Therefore, the corresponding rate R and distortion D value may be estimated, and the Lagrangian cost R+λ.D may be calculated for each quantized value, so as to select the value that minimizes this cost.

Figure 2:
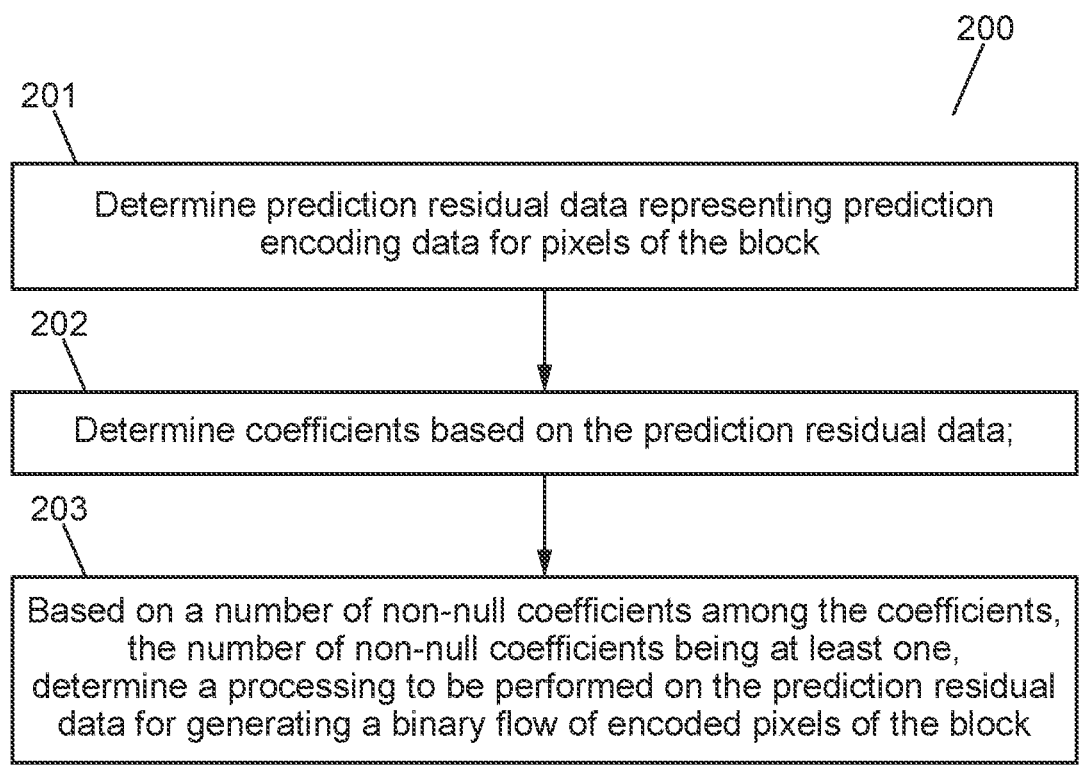
FIG. 2 shows a block schematic diagram illustrating an exemplary image processing method according to one or more embodiments of the present subject disclosure.

FIG. 2 is a block schematic diagram of an exemplary image processing method 200 according to one or more embodiments of the present subject disclosure.

An image which is to be processed may be divided into a plurality of pixel blocks, which may or may not be of equal size or of same shape, for example for purposes of encoding the image through encoding of the blocks according to a processing sequence. The method 200 may be applied to one of the pixel blocks of the image, which may be indifferently referred to in the following as the "input block" or the "current block".

As shown in FIG. 2, prediction residual data representing prediction encoding data for pixels of the current block may be determined (201).

Depending on the embodiment, the prediction residual data may be determined using any suitable prediction encoding scheme that generates prediction residual data performed on pixel data of the current block, such as, for example, a prediction encoding scheme specified for an AV1 or VVC compliant encoder.

In one or more embodiments, the prediction residual data may be processed in order to determine (202) coefficients based on the prediction residual data.

For example, processing performed on the prediction residual data may comprise processing that performs a mathematical operation on the prediction residual data, such as, for example, a space-frequency transform (e.g. a Discrete Cosine Transform (DCT), a Discrete Sine Transform (DST), a wavelet transform, etc.).

In some embodiments, the coefficients may be determined based on the prediction residual data using a space-frequency transform performed on the prediction residual data. A space-frequency transform performed on input data may produce frequency components, and in some embodiments the coefficients may be determined based on the frequency components.

That is, in some embodiments, further processing may be performed on the result of the space-frequency transform performed on the prediction residual data.

For example, in one or more embodiments, data resulting from a space-frequency transform performed on the prediction residual data may be quantized in order to reduce their magnitude, so as to reduce their signaling cost, for example expressed as a bitrate level.

In other embodiments, a threshold may be applied to data resulting from a space-frequency transform performed on the prediction residual data so as to force to a zero-level data below the threshold, and to a one-level data above the threshold.

Once the coefficients have been determined, non-null coefficients may be distinguished from null coefficients, and in cases where there is at least one non-null coefficient among the determined coefficients, the number of non-null coefficients may be used to determine (203) a processing performed on the prediction residual data for generating a binary flow of encoded pixels of the block.

The number of non-null coefficients obtained based on the prediction residual data may advantageously be used to define one or more criteria for determining a processing to be performed on the prediction residual data for generating a binary flow of encoded pixels of the block.

In one or more embodiments, the coefficients may be determined by performing a transform, such as for example a space-frequency transform, on the prediction residual data. In such embodiments, the processing to be performed on the prediction residual data for generating a binary flow of encoded pixels of the block may comprise a transform of the prediction residual data. Therefore, in such embodiments, a transform may be performed on the prediction residual data, resulting in coefficients, and the non-zero number of non-null coefficients among such coefficients may be used as a criterion based on which the transform performed on the prediction residual data for generating a binary flow of encoded pixels of the block may be determined.

Various parameters may be considered for determining the transform performed on the prediction residual data for generating a binary flow of encoded pixels of the block.

For example, the transform applied to the prediction residual data may be defined by a set of one or more transform parameters such as a transform block size (e.g. chosen among predefined transform sizes), and a transform type. For example, the transform type may be a 2-D transform type constructed as a combination of 1-D transform kernels. Transform kernels may also be of different types, such as a discrete cosine transform (DCT) kernel, a discrete sine transform (DST) kernel, an asymmetric discrete sine transform (ADST) kernel, etc.

In some embodiments, one or more transform parameters may be selected based on the number of non-null coefficients.

In some embodiments, one or more transform may be predefined, and determining the transform to be performed on the prediction residual data for generating a binary flow of encoded pixels of the block may comprise selecting a transform among one or more predefined transforms, or alternatively or in addition, selecting a type of transform among one or more predefined types of transform.

For example, the H.266NVC specification provides a list of predefined types of transforms (including transform types sometimes referred to as "DCT-II," "DCT-VIII," and "DST-VII" transform types) which may be tested to determine an optimal type of transform to be used on prediction residual data generated for a current block.

Embodiments of the present subject disclosure therefore advantageously provide a scheme that avoids testing a large number of transforms or transform types according to a suitable selection criterion (for example in order to minimize a cost function) and provides faster and less computationally complex way of determining the transform that is to be used on the prediction residual data of the current pixel block for purposes of generating the binary flow of encoded pixels of the block.

In one or more embodiments, the coefficients may be determined by performing a quantization operation on the prediction residual data. In such embodiments, the processing to be performed on the prediction residual data for generating a binary flow of encoded pixels of the block may comprise a quantization of transformed prediction residual data. Therefore, in such embodiments, a transform may be performed on the prediction residual data, resulting in transform coefficients, which may be quantized, resulting in quantized coefficients, and the non-zero number of non-null quantized coefficients among the quantized coefficients may be used as a criterion based on which the quantization operation performed on the transformed prediction residual data for generating a binary flow of encoded pixels of the block may be determined.

Various parameters may be considered for determining the quantization operation performed on the transformed prediction residual data for generating a binary flow of encoded pixels of the block.

For example, the quantization applied to the transformed prediction residual data may be defined by a set of one or more quantization parameters such as a quantization step, and frequencies of the transform coefficients.

In some embodiments, one or more quantization schemes may be predefined, and determining the quantization to be performed on transformed prediction residual data for generating a binary flow of encoded pixels of the block may comprise selecting a quantization scheme among one or more predefined quantization schemes, or alternatively or in addition, selecting a type of quantization among one or more predefined types of quantization.

Figure 3:
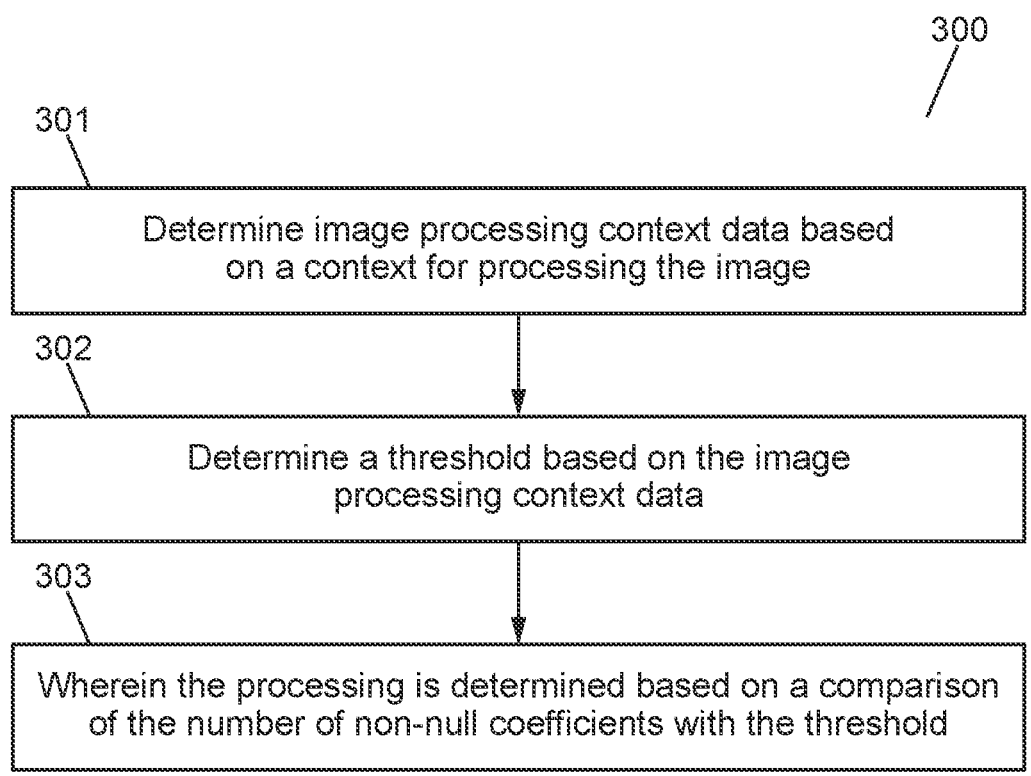
FIG. 3 shows a block schematic diagram illustrating an exemplary image processing method according to one or more embodiments of the present subject disclosure.

FIG. 3 is a block schematic diagram of an exemplary image processing method (300) according to one or more embodiments of the present subject disclosure.

In one or more embodiments, image processing context data may be determined (301) based on a context for processing the image.

Depending on the embodiment, the context may cover one or more aspects of processing the image, so that image processing context data may comprise one or more parameters for or related to the processing of the image.

Context data may comprise one or more parameters used in the processing (e.g. the encoding) of the current block, and/or one or more parameters related to configuration of the processing, such as, for example, a speed parameter, a quantization step (QP) parameter, a type and/or a hierarchy level of the image under processing. The speed parameter may in some embodiments comprise a parameter representing a processing speed required for the processing under consideration. For example, the speed parameter may comprise a required encoding speed, e.g. for encoding live content.

Depending on the embodiment, the context data may comprise any parameter that may impact the number of coefficients for a given block size and/or any parameter related to computation complexity of the operations described herein.

For example, image processing context data may comprise one or more of the following parameters: processing speed, quantization step, type of image encoding (Intra, Inter, etc.), type of image under processing (Intra, Inter, Bidirectional, etc.), hierarchic level of image under processing, any quantization parameter, any transform parameter, a subset of quantization parameters associated with a predefined quantization identifier, a subset of transform parameters associated with a predefined transform identifier, and any combination of the above.

Once image processing context data has been determined or, depending on the embodiment, obtained, a threshold may be determined (302) based on the image processing context data.

Once the threshold has been determined, the processing of the current block can be determined (303) based on a comparison between the number of non-null coefficients and the threshold.

In some embodiments, determining the processing of the current block comprises determining a set of one or more parameters of a same processing operation (e.g. a set of transforms of different types, a set of quantization operations with different parameters (quantization step, etc.), etc.)—thereby defining a set of operations—to be tested on the prediction residual data in order to determine a preferred processing operation for performing on the prediction residual data. The extent to which the set of operations is large, which will depend in some embodiments on the threshold, may in some embodiments determine the type of early exit to be applied in order to avoid testing too large of a number of operations while determining the preferred one based on various criteria.

Figure 4:
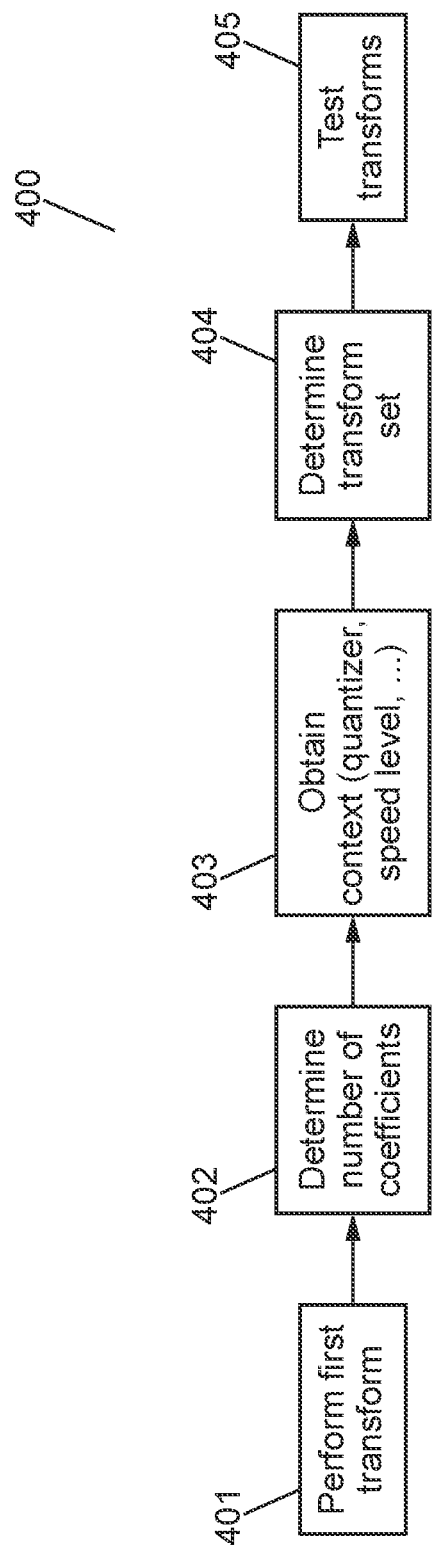
FIG. 4 shows a block diagram illustrating an exemplary image processing method in accordance with one or more embodiments of the present subject disclosure.

In one or more embodiments, the principles of the exemplary image processing method illustrated on FIG. 3 can be applied for a rapid selection of transform types, as illustrated by the exemplary diagram of FIG. 4 which shows an exemplary image processing method (400) according to embodiments of the present subject disclosure.

In one or more embodiments, the determining of the coefficients may comprise the determining first transform coefficients by applying a first transform (401) to the prediction residual data.

Performing the first transform on the prediction residual data may generate coefficients, among which non-null coefficients may be obtained. In some embodiments, a number of non-null coefficients may be deduced (402) from the set of coefficients generated by performing the first transform on the prediction residual data.

In some embodiments, the number of non-null transform coefficients among the first transform coefficients resulting from performing the first transform on the prediction residual data may advantageously be used as an early exit criterion for deciding whether or not it is worth testing (and therefore performing, which increases the computation complexity and the coding latency) other transforms or transform types.

Therefore, in some embodiments, based on a first number of non-null transform coefficients among the first transform coefficients (such first number of non-null transform coefficients being at least one), a transform to be performed on the prediction residual data for generating a binary flow of encoded pixels of the block may be selected.

In some embodiments, it may be determined, based on the number of non-null transform coefficients among the first transform coefficients resulting from performing the first transform on the prediction residual data, that there is no sufficient benefit in testing other transforms or transform types besides the first transform, in which case the transform used for generating the binary flow of encoded pixels of the block may be the first transform.

The first transform may therefore be seen as a transform which is systematically performed in order to obtain a set of coefficients, and based on this set of coefficients, a non-null number of coefficients.

The specific situation in which there is no non-null coefficient in the set of coefficients resulting from a performed transform may be considered as a borderline case.

In one or more embodiments, various schemes may be used for defining the first transform that is to be systematically performed on the prediction residual data.

In some embodiments, a plurality of candidate transforms may be tested, and the coefficients resulting therefrom may be quantized using a quantization scheme selected among a plurality of quantization schemes as optimum based on various encoding parameters used for encoding the current block (which encoding parameters may comprise the tested transform, spatial prediction coding (e.g. an intra prediction direction), temporal prediction coding (e.g. a partitioning in inter prediction), etc.).

In one or more embodiments, a candidate transform that is close to DCT may be defined and tested, as the DCT transform produces the best results when used alone (in cases where a single (or first, in cases where a second transform is applied to the transformed coefficients) transform is applied to the prediction residual data) in terms of coding efficiency. For example, a candidate transform such as the DCT2/DCT2 may selected as first transform in a VVC codec, and a candidate transform such as the DCT/DCT may selected as first transform in an AV1 codec.

Once the first transform is performed on prediction residual data, and the coefficients resulting from the first transform are quantized, a first non-zero number of non-null coefficients may be obtained. In one or more embodiments, the first number of non-null coefficients may be compared to a first threshold. Based on the comparison of the first number of non-null coefficients with the first threshold, the processing to be performed on the prediction residual data for generating the binary flow of encoded pixels of the current block may be determined.

In one or more embodiments, the first threshold may be determined based on one or more parameters, collectively referred to in the following as an "encoding context." For that purpose, in some embodiments, a context may be retrieved (403), so as to obtain and/or determine parameters forming the context, based on which the first threshold may be determined.

In one or more embodiments, the first threshold may be determined based on a speed parameter. Using a speed criterion advantageously allows choosing a threshold based on which early exit may be decided that depends on a required encoding speed. For example, the greater the required encoding speed, the more it will be acceptable to ignore coding efficiency, which may lead to choosing a high value for the first threshold, so that early exit occurs promptly.

In one or more embodiments, the first threshold may be determined based on a quantization step parameter. As a same residual will produce many less coefficients using a high QP as compared to using a low QP, the quantization step that is to be used for quantization of the coefficients may advantageously be used to determine first threshold, which in turn will determine how fast early exit will occur.

In one or more embodiments, the first threshold may be determined based on a type and/or a hierarchy level of the image under processing.

For example, an Intra image will produce more coefficients than an Inter image. In addition, in embodiments wherein a Lagrangian optimization scheme is used whereby a parameter A controls the optimization (for example the optimization problem of minimizing a distortion D under the constraint of a rate R, the D+λ.R cost), the parameter A will depend on the quantization step but also on the hierarchy level (e.g. in a pyramidal referencing structure) of the image.

In one or more embodiments, a set of transforms (preferably of different types) may be determined (404) based on the first threshold. The transforms of the set may then be tested in order to select a preferred transform which is to be applied to the prediction residual data for generating the binary flow of encoded pixels of the block.

Therefore, advantageously, the number of non-null coefficients may be used as a criterion for defining a set of transforms to be tested for selecting a preferred transform. In some embodiments, the number of non-null coefficients may be compared to a first threshold, which may be dynamically determined based on context data, and the result of the comparison may advantageously be used for defining the set of transforms to be tested.

In some embodiments, a predefined set of transforms (or types thereof) may be used, so that defining the set of transforms to be tested may be reduced to determine a number of transforms (or type thereof) to be tested. The set of transforms to be tested may then be defined by selecting, from the predefined set of transforms (or types thereof), according to a predefined sequence order, transforms up to the determined number of transforms. For example, in the case where it is determined that N transforms (or types thereof) are to be tested, the set of transforms to be tested may be configured with the N first elements of the predefined set of transforms.

As the number of transforms to be tested may depend in some embodiments on the number of non-null coefficients, the present subject disclosure provides that the number of non-null coefficients may advantageously be used as an early exit criterion for selecting the preferred transform to be applied to the prediction residual data.

Therefore in some embodiments, the set of transforms to be tested may be dynamically determined based on a number of non-null coefficients generated by a first transform performed on prediction residual data. Once the set is determined, the one or more transforms of this set (which comprises, at minima, the first transform) may be tested and evaluated, so that a preferred transform may be selected in this set of transforms to be tested, for example based on a selection criterion, e.g. a Lagrangian cost based decision criterion.

In one or more embodiments, the first number of non-null transform coefficients may be compared to a threshold (that may be referred to as "first transform coefficient threshold"), and based on the first number of non-null transform coefficients being smaller to the first transform coefficient threshold, the first transform coefficients may be used for generating transformed prediction residual data. That is, in some embodiments, it may advantageously be decided to select the first transform, and therefore use, for generating transformed prediction residual data for the processing of the current block, the first transform coefficients that will have been already calculated, instead of performing further tests of transforms or transform types (early exit), so as to limit the computational complexity and therefore decrease the computational latency.

For example, in some embodiments, a number N of non-null coefficients generated by the first transform may be compared to a first threshold T1. Depending on the embodiment, the threshold T1 may be predefined, or dynamically determined, for example based on context data.

Context data may comprise one or more parameters used in the processing (e.g. the encoding) of the current block, and/or one or more parameters related to configuration of the processing, such as, for example, a speed parameter, a quantization step (QP) parameter, a type and/or a hierarchy level of the image under processing. The speed parameter may in some embodiments comprise a parameter representing a processing speed required for the processing under consideration. For example, the speed parameter may comprise a required encoding speed, e.g. for encoding live content.

Depending on the embodiment, the context data may comprise any parameter that may impact the number of coefficients for a given block size and/or any parameter related to computation complexity of the operations described herein.

Context data may for example comprise one or more of a processing speed, quantization step, type of image encoding (Intra, Inter, etc.), a type of image under processing (e.g. Intra, Inter, etc.), a hierarchic level of image under processing, any quantization parameter, any transform parameter, a subset of quantization parameters associated with a predefined quantization identifier, a subset of transform parameters associated with a predefined transform identifier, and any combination of the above.

The first transform may be based on DCT-type 1-D transforms, such as for example the DCT2/DCT2 in a VVC codec, and the DCT/DCT in an AV1 codec. Based on the number N being inferior to the first threshold T1, early exit may be decided and only the first transform may be used.

For example, the following may be applied in some embodiments: if $N<T_1$ (e.g. QP,Processing_Speed), only use a DCT-type transform.

In other embodiments, several thresholds may be used for defining an early exit criterion for selection of the transform scheme that is to be used for generating transformed prediction residual data, which advantageously provides a more relaxed early exit criterion.

That is, in one or more embodiments, the test of transforms in a predefined set of transforms may be performed based on the first number of non-null transform coefficients being greater than or equal to the first transform coefficient threshold and smaller than a second transform coefficient threshold. As a result, the transform to be performed on the prediction residual data for generating a binary flow of encoded pixels of the block may be selected among the first transform and transforms of the predefined set of transforms.

For example, in some embodiments, a second threshold T2, greater than the first threshold T1 in embodiments where the first threshold T1 is used, may be defined. Likewise the first threshold T1 (as the case may be), depending on the embodiment, the second threshold T2 may be predefined, or dynamically determined, for example based on context data.

Context data may comprise one or more parameters used in the processing (e.g. the encoding) of the current block, and/or one or more parameters related to configuration of the processing, such as, for example, a speed parameter, a quantization step (QP) parameter, a type and/or a hierarchy level of the image under processing. The speed parameter may in some embodiments comprise a parameter representing a processing speed required for the processing under consideration. For example, the speed parameter may comprise a required encoding speed, e.g. for encoding live content.

Depending on the embodiment, the context data may comprise any parameter that may impact the number of coefficients for a given block size and/or any parameter related to computation complexity of the operations described herein.

Context data may for example comprise one or more of a processing speed, quantization step, type of image encoding (Intra, Inter, etc.), a type of image under processing (e.g. Intra, Inter, etc.), a hierarchic level of image under processing, any quantization parameter, any transform parameter, a subset of quantization parameters associated with a predefined quantization identifier, a subset of transform parameters associated with a predefined transform identifier, and any combination of the above.

In some embodiments where the first threshold is not used, based on the number N being inferior to the second threshold T2, early exit may be decided and a number N_Test (N_Test being greater than one) of transforms (or types thereof), preferably including the first transform may be tested and evaluated for selecting the preferred transform to be applied to the prediction residual data for the processing of the current block.

In other embodiments, based on the number N being superior or equal to the first threshold T1, and being inferior to the second threshold T2, early exit may be decided and a number N_Test (N_Test being greater than one) of transforms (or types thereof), preferably including the first transform may be tested and evaluated for selecting the preferred transform to be applied to the prediction residual data.

For example, each of the following schemes may be applied in some embodiments:

If $N<T_1$ (e.g. QP,Processing_Speed), only use a DCT-type transform for generating the binary flow of encoded pixels of the block.

If $T_1$ (e.g. QP,Processing_Speed)$\leq N<T_2$ (e.g. QP,Processing_Speed), test N_test transforms to determine the transform to be used for generating the binary flow of encoded pixels of the block.

As another example in which only the second threshold T2 is used:

If $N<T_2$ (e.g. QP,Processing_Speed), test N_test transforms to determine the transform to be used for generating the binary flow of encoded pixels of the block.

In one or more embodiments, a predefined (second) set of transforms may be defined to include one or more identity transforms. In such cases, the test of transforms in a predefined (second) set of transforms may be performed based on the first number of non-null transform coefficients being greater (or, depending on the embodiment, greater or equal) than to a third transform coefficient threshold. As a result, the transform to be performed on the prediction residual data for generating a binary flow of encoded pixels of the block may be selected among the first transform and transforms of the predefined (second) set of transforms.

For example, in some embodiments, a third threshold T3, used as a minimum threshold, preferably greater than the first threshold T1 in embodiments where the first threshold T1 is used, and preferably greater than the second threshold T2 in embodiments where a second threshold T2 is used, may be defined. Likewise the first threshold T1 and the second threshold T2 (as the case may be), depending on the embodiment, the third threshold T3 may be predefined, or dynamically determined, for example based on context data.

Context data may comprise one or more parameters used in the processing (e.g. the encoding) of the current block, and/or one or more parameters related to configuration of the processing, such as, for example, a speed parameter, a quantization step (QP) parameter, a type and/or a hierarchy level of the image under processing. The speed parameter may in some embodiments comprise a parameter representing a processing speed required for the processing under consideration. For example, the speed parameter may comprise a required encoding speed, e.g. for encoding live content.

Depending on the embodiment, the context data may comprise any parameter that may impact the number of coefficients for a given block size and/or any parameter related to computation complexity of the operations described herein.

Context data may for example comprise one or more of a processing speed, quantization step, type of image encoding (Intra, Inter, etc.), a type of image under processing (e.g. Intra, Inter, etc.), a hierarchic level of image under processing, any quantization parameter, any transform parameter, a subset of quantization parameters associated with a predefined quantization identifier, a subset of transform parameters associated with a predefined transform identifier, and any combination of the above.

The finding that the number of non-null coefficients is greater than a third threshold T3 may be construed as an indication that the content of the current block comprises non-natural content (such as, for example, screen content, video game image content, etc.), in which case identity transforms (that is, transforms applying a multiplication factor to all residual values) are known to be efficient. Therefore, in some embodiments, based on the number N being superior to the third threshold T3, at least one identity transform may be included in the set of transforms (or types thereof) to be tested. In some embodiments, the number N may further be compared to the first threshold T1 and/or, as the case may be, the second threshold T2, in order to determine perform early exit accordingly as described above depending on the embodiment.

For example, the following scheme may be applied in some embodiments:

If N>$T_3$ (e.g. QP,Processing_Speed), test at least one identity transform.

Depending on the embodiment, various combinations including one or more of the first, second, and third thresholds described above may be used. The value of each threshold may be configured based on, inter alia, the value of other thresholds used according to embodiments of the present subject disclosure.

Figure 5:
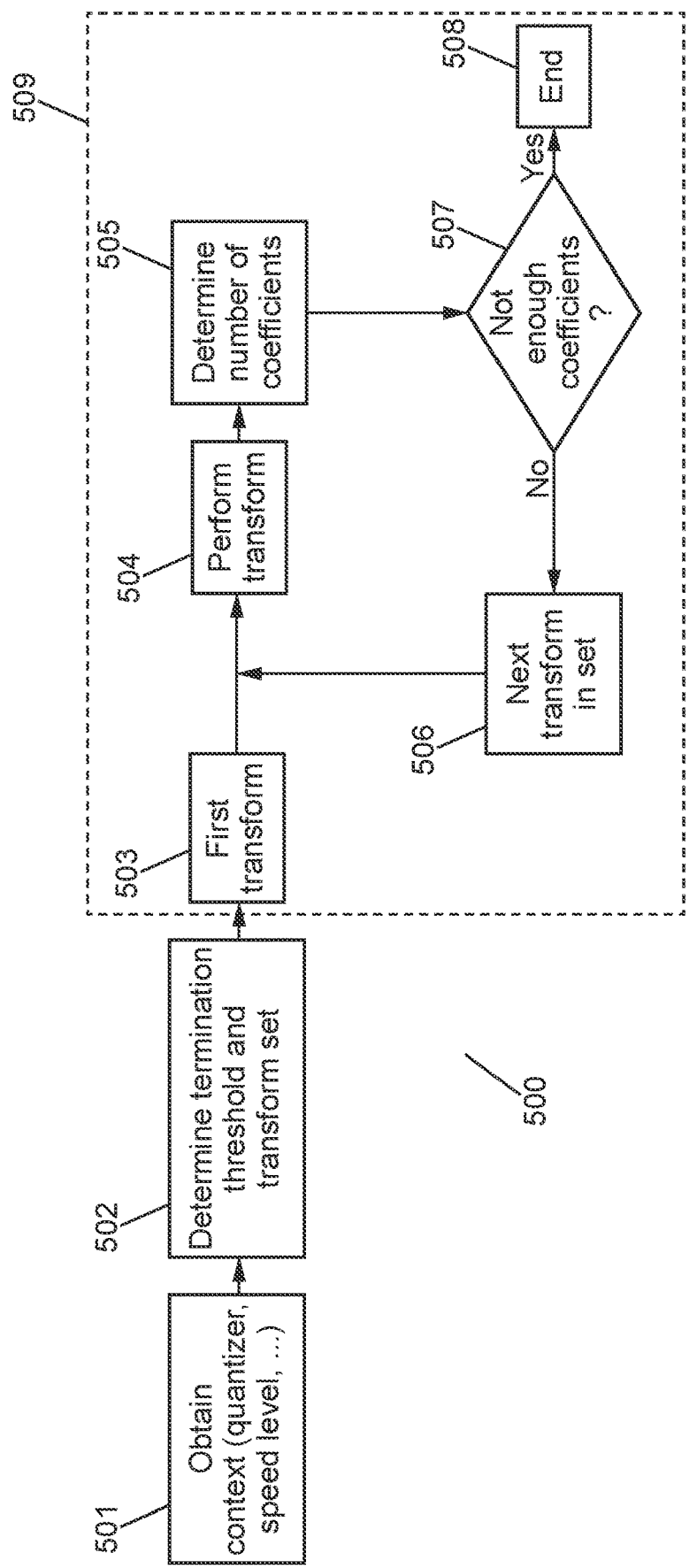
FIG. 5 shows a block schematic diagram illustrating an exemplary image processing method according to one or more embodiments of the present subject disclosure.

FIG. 5 is a diagram illustrating an exemplary image processing method (500) according to one or more embodiments of the present subject disclosure.

Referring to FIG. 5, in one or more embodiments, the proposed scheme may implement a so-called "transform test" loop, and may further comprise: perform at least one iteration of a transform test loop, an $N^{th}$ iteration of the transform test loop comprising, N being a transform test loop counter initialized to one: determine $N^{th}$ test loop transform coefficients by applying an $N^{th}$ test loop transform to the prediction residual data. In such embodiments, the transform to be used for generating a binary flow of encoded pixels of the block may further be based on an $N^{th}$ number of non-null test loop transform coefficients among the $N^{th}$ test loop transform coefficients, the $N^{th}$ number of non-null test loop transform coefficients being at least one, and the $N^{th}$ transform may be of a type different from a type of the first transform and a type of the $i^{th}$ transform used during any previous iteration of the transform test loop.

In some embodiments, a threshold, such as for example the first transform coefficient threshold, may be used as a criterion for exiting the loop: in the case where each of the first number of the non-null coefficients and the $N^{th}$ number of the non-null test loop transform coefficients are smaller than the first transform coefficient threshold, the loop may be exited (no further iteration of the loop may be performed), and the transform to be performed on the prediction residual data (for generating a binary flow of encoded pixels of the block) may be selected in a set of tested transforms comprising the first transform and transforms used during executed iterations of the transform test loop. Otherwise, if the first number of the non-null coefficients and the $N^{th}$ number of the non-null test loop transform coefficients are not smaller than the first transform coefficient threshold, an additional iteration of the transform test loop may be performed.

For example, in one or more embodiments, a context may be obtained (501), for example from processing configuration data. The context data may comprise one or more parameters used in the processing (e.g. the encoding) of the current block, and/or one or more parameters related to configuration of the processing, such as, for example, a speed parameter, a quantization step (QP) parameter, a type and/or a hierarchy level of the image under processing. The speed parameter may in some embodiments comprise a parameter representing a processing speed required for the processing under consideration. For example, the speed parameter may comprise a required encoding speed, e.g. for encoding live content.

Depending on the embodiment, the context data may comprise any parameter that may impact the number of coefficients for a given block size and/or any parameter related to computation complexity of the operations described herein.

Context data may for example comprise one or more of a processing speed, quantization step, type of image encoding (Intra, Inter, etc.), a type of image under processing (e.g. Intra, Inter, etc.), a hierarchic level of image under processing, any quantization parameter, any transform parameter, a subset of quantization parameters associated with a predefined quantization identifier, a subset of transform parameters associated with a predefined transform identifier, and any combination of the above.

In one or more embodiments, a test termination threshold may be determined (502) based on the context, e.g. based on one or more parameters comprised in context data. Further, a set of transforms (preferably of different types) to be tested may be determined (502) based on the context data. The retrieved context may therefore advantageously be used to determine a test termination criterion, and a set of transforms (or types thereof) to be tested. In some embodiments, one or more transforms from the set of transforms to be tested may be tested, for example in respective iterations of a transform test loop (509), until the test termination criterion may be fulfilled.

In some embodiments, the transform test loop (509) may be initialized by determining (503) a first transform to be tested first on the prediction residual data.

As described above, various schemes may be used depending on the embodiment for determining a first transform that is to be used for performing the first test on the prediction residual data. For example, a first transform that is close to DCT may advantageously be used, as the DCT transform produces the best results when used alone (in cases where a single transform is applied to the prediction residual data) in terms of coding efficiency. For example, the DCT2/DCT2 may selected as first transform in a VVC codec, and the DCT/DCT may selected as first transform in an AV1 codec. Therefore a first transform may be performed on the prediction residual data in order to initialize an iterative evaluation of transforms (or types thereof).

In some embodiments, each $i^{th}$ iteration of the transform test loop (509) (i being the loop iteration counter, initialized to 1) may comprise the following operations:

Performing (504) the $i^{th}$ transform to be tested on the prediction residual data, which may produce a $i^{th}$ set of coefficients, possibly after performing a quantization of the coefficients directly produced by the $i^{th}$ transform to be tested. For the first iteration of the loop, the transform to be tested will have been initialized to the first transform.

An $i^{th}$ number of non-null coefficients may be deduced (505) from the $i^{th}$ set of coefficients generated by performing (504) the $i^{th}$ transform to be tested on the prediction residual data (and possibly performing a quantization operation).

The $i^{th}$ number of non-null coefficients may be compared to the test termination threshold, in order to determine (507) whether the $i^{th}$ number of non-null coefficients is large enough to continue testing transforms, or otherwise is under the threshold that is used as test termination criterion.

In the case where it is determined that there are not enough coefficients in the set of non-null coefficients (for example the $i^{th}$ number of non-null coefficients is smaller than the test termination threshold), the transform test loop may end, so that no further transform (or type thereof) may be tested. In such case, it may advantageously be considered that the tested transform led to sufficiently optimizing the processing (e.g. the encoding), and that all previously tested transforms may be considered as evaluated.

In the case where it is determined that there are enough coefficients in the set of non-null coefficients (for example the $i^{th}$ number of non-null coefficients is greater than or equal to the test termination threshold), the transform test loop may proceed to determine (506) a next transform in the set of transforms to be tested. In other words, if there are too many non-null coefficients, the tests of transforms may continue with the next transform being performed as part of the $(i+1)^{th}$ iteration of the transform test loop.

Even though the transform test loop operations have been described above in embodiments wherein a number of non-null coefficients was used as a criterion for selecting an optimum transform among the transforms (or types thereof) that were tested, it will be appreciated by those having ordinary skill in the relevant art that any suitable criterion, such as, for example, a Lagrangian cost criterion, may be used as part of embodiments of the present subject disclosure in place of the criterion based on a number of non-null coefficients which is given by way of example only.

In one or more embodiments, the set of transforms (or types thereof) to be tested may comprise combinations of DCT-type and DST-type transforms (preferably combined in pairs, in order to perform the transform in the vertical and horizontal dimensions), for example as predefined in a video encoding standard specification, such as AV1 and VV1. In some embodiments, the set of transforms (or types thereof) to be tested may comprise combinations that involve an identity transform (such as, for example, the "transform skip" operation defined for HEVC), as the identity transform may advantageously be used in embodiments where the quantization step is small (for example in cases where the quantization step varies between 0 and 16, or between 0 and 8.

According to embodiments of the present subject disclosure, a number of non-null coefficients may also be used for selecting a quantization operation to be used on transformed prediction residual data. In some embodiments, coefficients may be determined by performing quantization on transformed prediction residual data, and the processing (to be performed on the prediction residual data for generating a binary flow of encoded pixels of a block of an image being processed) may comprise a quantization of transformed prediction residual data. For example, a number of non-null coefficients may be used in a criterion for determining whether a quantization operation should be used or not.

Figure 6:
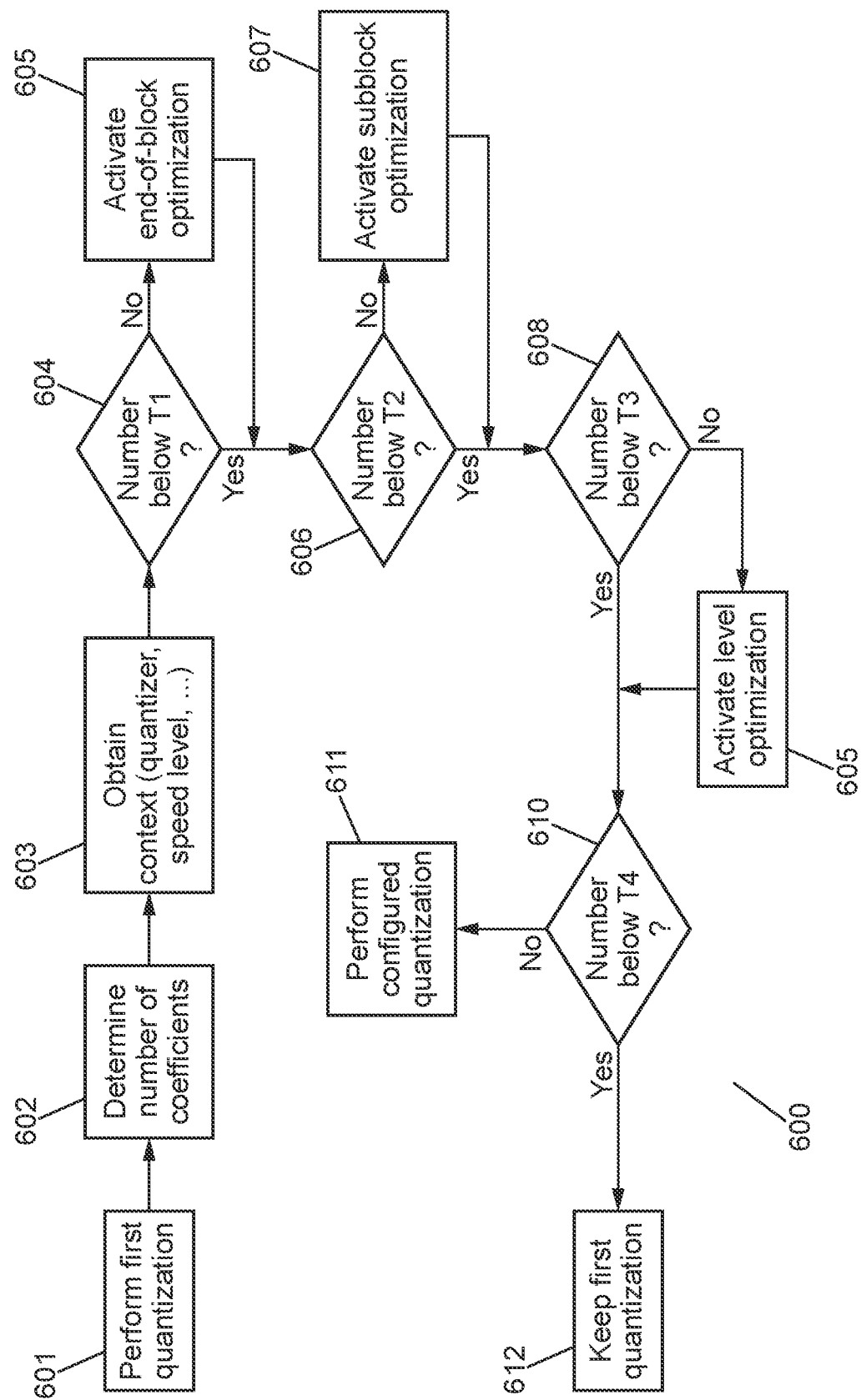
FIG. 6 shows a block schematic diagram illustrating an exemplary image processing method according to one or more embodiments of the present subject disclosure.

FIG. 6 is a block schematic diagram of an exemplary image processing method 600 according to one or more embodiments of the present subject disclosure.

In one or more embodiments, a first quantization operation may be performed on transformed prediction residual data.

Performing the first quantization on the transformed prediction residual data may generate quantized coefficients, among which non-null coefficients may be obtained. In some embodiments, a number of non-null coefficients may be deduced (602) from the set of quantized coefficients generated by performing the first quantization on the transformed prediction residual data.

In some embodiments, the number of non-null quantized coefficients among the quantized coefficients resulting from performing the first quantization on the transformed prediction residual data may advantageously be used as an early exit criterion for deciding whether or not it is worth testing (and therefore performing, which increases the computation complexity and the coding latency) other quantization operations.

The first quantization may therefore be seen as a quantization which is systematically performed in order to obtain a set of coefficients, and based on this set of coefficients, a non-null number of coefficients.

The specific situation in which there is no non-null coefficient in the set of coefficients resulting from a performed quantization may be considered as a borderline case.

In one or more embodiments, various schemes may be used for defining the first quantization that is to be systematically performed on the transformed prediction residual data.

In some embodiments, a plurality of candidate quantization operations may be tested, and the first quantization operation may be selected among the candidate quantization operations based on one or more suitable selection criteria. For example, the following quantization (sometimes referred to as "scaling" operation) may be used as the first quantization: lv=(abs(coeff[x][y])*m[x][y]+dz)>>shift, where lvl is the quantization level determined for the coefficient coeff[x][y], dz (deadzone) is a rounding value, and m[x][y]/$2^{shift}$ represents the scaling applied to the magnitude of the coefficient. This quantization operation is well-suited for fast computing implementations, such as, for example, parallel computing implementations, as well as for a fast determination of the number of non-null coefficients. Indeed, multipliers (of small quantities) and shifts are commodities in DSP processing, i.e. multiple such operations can be performed in one clock cycle.

Once the first quantization is performed on transformed prediction residual data, a first non-zero number of non-null quantized coefficients may be obtained (602) based on the quantized coefficients resulting from the first quantization. In one or more embodiments, the first number of non-null quantized coefficients may be compared to one or more thresholds. For example, the first number of non-null quantized coefficients may be compared to a first threshold T1. Based on the comparison of the first number of non-null quantized coefficients with the first threshold T1, a processing to be performed on the prediction residual data for generating the binary flow of encoded pixels of the current block may be determined.

Depending on the embodiment, one or more of the one or more thresholds may be predefined, or determined dynamically.

In some embodiments, dynamic determination of a threshold may be performed based on a context for processing the image.

Depending on the embodiment, the context may cover one or more aspects of processing the image, so that image processing context data may comprise one or more parameters for processing the image.

For example, image processing context data may comprise one or more of the following parameters: processing speed, quantization step, type of image encoding (Intra, Inter, etc.), type of image under processing (e.g. Intra, Inter, etc.), hierarchic level of image under processing, any quantization parameter, any transform parameter, a subset of quantization parameters associated with a predefined quantization identifier, a subset of transform parameters associated with a predefined transform identifier, and any combination of the above.

Once image processing context data has been determined or, depending on the embodiment, obtained (603), one or more thresholds may be determined based on the image processing context data in order to be used as respective quantization determination criteria using the number of non-null quantized coefficients. For example, as illustrated on FIG. 6, a specific threshold can be used as a criterion for activating, that is, using or not a corresponding quantization optimization for the quantization of the transformed prediction residual data.

Depending on the embodiment, various quantization optimization schemes that are defined in a video codec standard of interest and would otherwise have to be tested may be instead associated with respective thresholds for fast determination as to whether or not to use them.

For example, an end-of-block quantization optimization scheme (605), such as specified for the HEVC, VVC, AV1, VP9, JPEG codecs with respective specificities, may be associated with a first threshold T1.

As another example, a sub-block optimization scheme (607), such as specified in video codec standards which specify an intermediary signaling, may be associated with a second threshold T2.

As yet another example, a coefficient quantized level (value "lvl") optimization scheme, may be associated with a third threshold T3.

It will be appreciated by those having ordinary skill in the relevant art that any combinations of one or more of the above-mentioned quantization optimization schemes (e.g. using only one of the above-mentioned optimization schemes with its corresponding threshold, a combination of two of the above-mentioned optimization schemes with their respectively corresponding thresholds, or using a combination of the three above-mentioned optimization schemes with their respectively corresponding thresholds) may be used as part of embodiments of the present subject disclosure in place of the above described combination which is given by way of example only. Further, it will be appreciated by those having ordinary skill in the relevant art that any suitable quantization optimization scheme, such as, for example, as specified in a video codec standard of interest, may be used as part of embodiments of the present subject disclosure in place of or in addition to the above-mentioned quantization optimization schemes which are given by way of example only.

Once the one or more thresholds have been determined, the processing of the current block can be determined, that is, one or more quantization optimization schemes can be activated for use for quantization of the transformed prediction residual data, based on comparisons between the number of non-null quantized coefficients and the respectively corresponding thresholds.

For example, as illustrated on FIG. 6, the number of non-null quantized coefficients may be compared (604) with a first threshold T1 which will have been determined, possibly based on the context, to be associated with a first quantization optimization scheme (e.g. the end-of-block quantization optimization scheme). In cases where the number of non-null quantized coefficients is not smaller than the first threshold T1, the first quantization optimization scheme may be activated (605), that is, it may be determined to use the first quantization optimization scheme in the quantization of the transformed prediction residual data.

In addition, in some embodiments, the number of non-null quantized coefficients may further be compared (606) with a second threshold T2 which will have been determined, possibly based on the context, to be associated with a second quantization optimization scheme (e.g. the sub-block quantization optimization scheme). In cases where the number of non-null quantized coefficients is not smaller than the second threshold T2, the second quantization optimization scheme may be activated (607), that is, it may be determined to use the second quantization optimization scheme in the quantization of the transformed prediction residual data.

In addition, in some embodiments, the number of non-null quantized coefficients may further be compared (608) with a third threshold T3 which will have been determined, possibly based on the context, to be associated with a third quantization optimization scheme (e.g. the coefficient quantized level quantization optimization scheme). In cases where the number of non-null quantized coefficients is not smaller than the third threshold T3, the third quantization optimization scheme may be activated (609), that is, it may be determined to use the third quantization optimization scheme in the quantization of the transformed prediction residual data.

In one or more embodiments, iterations of an optimization activation loop may be performed so as to select quantization optimization schemes that are to be activated. For example, in embodiments in which N_loop quantization optimization schemes are to be tested, N_loop thresholds $(T_i)_{i=1,\ldots,N}$ will be determined. Each threshold $T_i$ ("i" being the threshold index) may be predefined or, depending on the embodiment, may be dynamically determined, for example, based on the obtained context data. Further, each threshold $T_i$ may be determined to be used for testing the $i^{th}$ quantization optimization scheme. At the $i^{th}$ iteration of the optimization activation loop, the number of non-null quantized coefficients may be compared with the $i^{th}$ threshold $T_i$. In cases where the number of non-null quantized coefficients is not smaller than the $i^{th}$ threshold $T_i$, the $i^{th}$ quantization optimization scheme may be activated, that is, it may be determined to use the $i^{th}$ quantization optimization scheme in the quantization of the transformed prediction residual data. The optimization activation loop may be completed once the $N\_loop^{th}$ quantization optimization scheme has been tested through comparison of the number of non-null quantized coefficients with the $N\_loop^{th}$ threshold $T_{N\_loop}$.

Depending on the embodiment, the number N_loop of quantization optimization schemes to be considered may be determined based on the optimization schemes specified in a video codec standard under consideration.

In one or more embodiments, an early exit quantization threshold (T4 on FIG. 6) may also be configured (in a predefined manner or, depending on the embodiment, dynamically, for example, based on the obtained context data) in order to determine whether the quantization operation applied to the transformed prediction residual data for generating the binary flow of encoded pixels of the current block should be configured with one or more of the tested quantization optimization schemes, or else should be limited to a single (and preferably computationally not complex) quantization operation, such as, for example, the first quantization which will have been already performed on the transformed prediction residual data.

In some embodiments, the number of non-null quantized coefficients may further be compared (610) with the early exit quantization threshold T4. In cases where the number of non-null quantized coefficients is not smaller than the early exit quantization threshold T4, a determination may be made to use a quantization scheme configured with one or more optimizations, such as optimizations activated further to the previous comparisons of the number of non-null quantized coefficients with respectively corresponding thresholds, in the quantization of the transformed prediction residual data. Otherwise, it may be determined to use the first quantization scheme for quantization of the transformed prediction residual data for generating the binary flow of encoded pixels of the current block.

Figure 7:
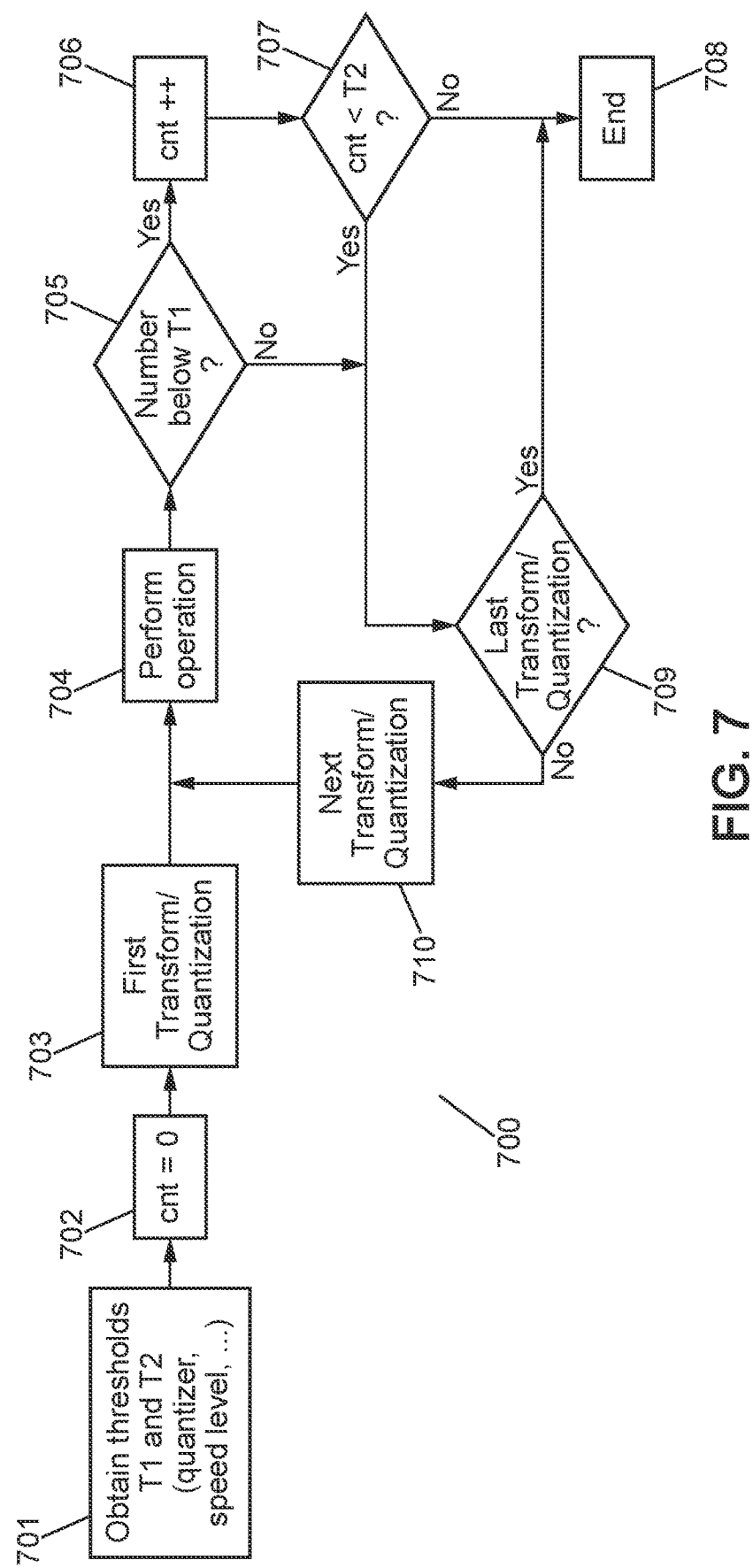
FIG. 7 shows a block schematic diagram illustrating an exemplary image processing method according to one or more embodiments of the present subject disclosure.

FIG. 7 is a diagram illustrating an exemplary image processing method (700) according to one or more embodiments of the present subject disclosure. These embodiments, which use a progressive termination criterion, advantageously provide a softer mode of decision for early exit through counting the number of times a criterion is not satisfied. In some embodiments, two early exit criteria may be used, so that a decision to stop testing further operations may be made based on subsequently applying these two criteria.

Depending on the embodiment, the progressive termination criterion scheme (an example of which is illustrated on FIG. 7) may be used for a transform operation or a quantization operation. This will be reflected in the following description by the term "transform/quantization" operation, thereby indicating that the operation to which the progressive termination criterion scheme described below with reference to FIG. 7 may be, depending on the embodiment, a transform operation a quantization operation.

As illustrated on FIG. 7, two thresholds T1 and T2 may be defined to implement in some embodiments a first and second early exit criteria. In one or more embodiments, the two thresholds T1 and T2 may be obtained (701) or determined, for example based on image processing context data as described above. In particular, the thresholds T1 and T2 may in some embodiments be advantageously chosen depending on a specific context which is defined based on context data chosen for the embodiment, that is, for example, depending on the quality of the transform and/or quantization algorithms, on a desirable speed level, on the hardware platform on which the scheme is implemented, or on a combination of the above. A value, which is considered optimum, of each threshold T1 and T2, may in some embodiments be determined based on testing of various context data configurations, so as to determine parameters deemed relevant for defining context data based on which the thresholds are determined, and values deemed optimum for these parameters.

In one or more embodiments, a counter "cnt" may be initialized (702), for example to a "0" value, for use as described below.

Further, a first "transform/quantization" operation may be determined (703) (e.g. identified in a set of predefined operations), in order to initiate a test loop. Depending on the embodiment, this first "transform/quantization" operation may be a first quantization or a first transform.

The test loop may be used to test different operations or types of operations in a predefined set, possibly ordered according to a priority or preference order, a ith operation (referred to as the "current operation" below) being tested during the ith operation (in particular the first operation being tested during the first iteration, and the last iteration being possibly performed for testing the last operation of the predefined set).

One or more iterations of the test loop are then performed, each iteration (of index "i" for the $i^{th}$ iteration) comprising the following:

First, a "transform/quantization" operation (704) (current operation) is performed on prediction residual data, to generate coefficients.

In the case where the loop iteration is the first iteration (i=0), the first "transform/quantization" operation previously determined (703) is performed. Depending on the embodiment, the above-described acts for purposes of selecting and/or applying a first transform to prediction residual data, for example in relation to item 401 on FIGS. 4 and 503 on FIG. 5 may be performed in embodiments where the first "transform/quantization" operation is a first transform. Likewise, the above-described acts for purposes of selecting and/applying a first quantization to (transformed) prediction residual data, for example in relation to item 601 on FIG. 6 may be performed in embodiments where the first "transform/quantization" operation is a first quantization.

As described above in relation with other embodiments, a number of non-null coefficients N(i) may be determined based on the coefficients generated by performing (704) the current operation.

The first early exit criterion is then applied to the current operation, for example as shown on FIG. 7 by comparing (705) the number of non-null coefficients N(i) with the first threshold T1. In the case where the number of non-null coefficients N(i) is smaller than the first threshold T1, no early exit is decided, and the iteration proceeds towards incrementing (706) the cnt counter for applying the second early exit criterion controlled by the second threshold. Indeed, it may be considered that the number N(i) being smaller than T1 is an indication that the first early exit criterion (controlled by the first threshold T1) is not met, so that testing another operation in the predefined test may provide better results (e.g. in the sense that they will meet the first early exit criterion).

Advantageously, in the proposed progressive termination scheme, even if it decided to continue testing further operations because a first early exit criterion was not met, which would increase the computational complexity and latency, a second early exit criterion (controlled by a second threshold T2) may be used to reflect a margin (a number of times) with which further tests may be conducted before exiting.

This is reflected in the example illustrated on FIG. 7 by the use of the second threshold T2: Once a decision to test another operation of the predefined set has been made because the first early exit criterion was not met for the current operation (706), a second threshold is used to validate this decision, for example by counting the number of times the first early exit criterion was not met and another operation was tested as a consequence thereof.

For example, as illustrated on FIG. 7, the loop counter cnt, once incremented (cnt++, 706), is compared (707) with the second threshold T2. In the case where the loop counter cnt is smaller than the second threshold T2, a subsequent iteration of the loop may proceed for testing another operation, subject to determining (709) whether the current operation that was tested was or not the last operation of the predefined set to be tested. In the case where the current operation that was tested was the last operation to be tested, the test loop ends (708), early exit is decided and no further test is conducted. Otherwise the iteration proceeds to determining (710) the next "transform/quantization" operation of the predefined set to be tested during the next $((i+1)^{th})$ iteration.

In the case where the loop counter cnt is not smaller than the second threshold T2, a maximum number of tested operations has been reached, so that the loop ends (708) which indicates that early exit is decided and no further test is conducted. Therefore, even though the comparison with the first threshold T1 (705) led to a subsequent iteration of the loop so that further tests may be performed, the number of these further tests is advantageously controlled through the second threshold T2. Said otherwise, the number of times it is decided to proceed with another iteration is controlled so that the loop may be ended and early exit performed even though the number of non-null coefficients did not meet a first criterion for early exit (controlled by the first threshold T1).

With respect to the above-described comparison (705) of the number of non-null coefficients N(i) with the first threshold T1, in the case where the number of non-null coefficients N(i) is not smaller than the first threshold T1, the current operation did not meet the first early exit criterion (controlled by the first threshold T1), and another operation may be tested, subject to determining (709) whether the current operation that was tested was the last operation to be tested or not. In the case where the current operation that was tested was the last operation to be tested, the loop ends (708). Otherwise the iteration proceeds to determining (710) the next "transform/quantization" operation to be tested during the next $((i+1)^{th})$ iteration.

Therefore, a second early exit criterion may be used to control the number of attempts that have been made for testing a different operation or type of operation, further to a first early exit criterion not being met by a current operation being tested. The second early exit criterion not being met indicates that too many attempts have been made which did not provide satisfactory results in that the first early exit criterion was not met, so that early exit may be decided as it may be considered that it is not worth testing further operations because better results will not be obtained.

Figure 8:
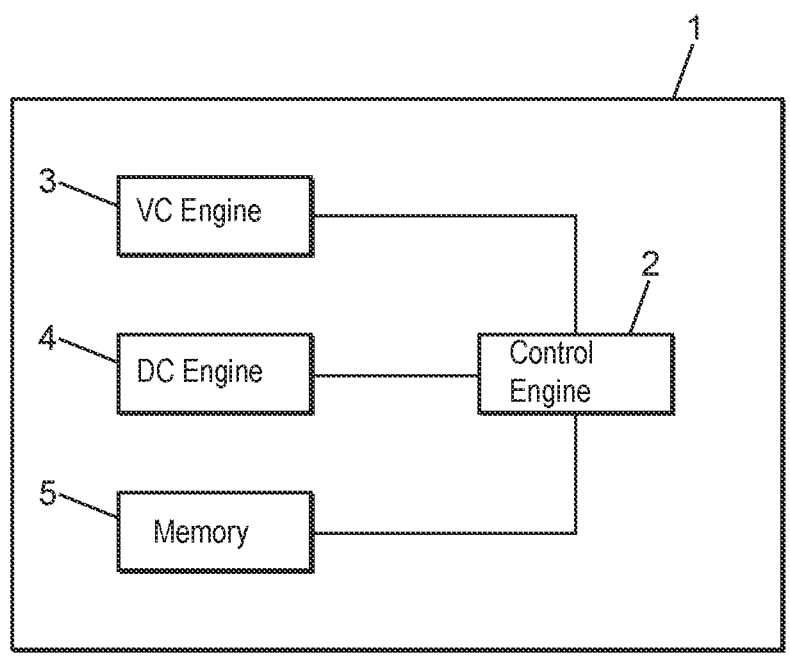
FIG. 8 illustrates an exemplary apparatus, such as for example a video encoder, according to one or more embodiments.

FIG. 8 illustrates an exemplary video coding apparatus or unit 1 configured to use an image processing feature in accordance with embodiments of the present subject disclosure.

The apparatus 1, which may comprise one or more computers, includes a control engine 2, a video compression (VC) engine 3, a data communication (DC) engine 4, a memory 5, and a power supply (e.g., a battery, plug-in power supply, etc.) (not represented on the figure).

In the architecture illustrated on FIG. 8, all of the video compression engine 3, data communication engine 4, and memory 5 are operatively coupled with one another through the control engine 2.

In one embodiment, the video compression engine 3 is configured to perform various aspects of embodiments of the proposed method for network management as described herein.

In one embodiment, the data communication engine 4 is configured to receive input video data and output an encoded bit stream, and process received input video data.

The control engine 2 includes a processor, which may be any suitable microprocessor, microcontroller, Field Programmable Gate Arrays (FPGA), Application Specific Integrated Circuits (ASIC), Digital Signal Processing chip, and/or state machine, or a combination thereof. According to various embodiments, one or more of the computers can be configured as a multi-processor computer having multiple processors for providing parallel computing. The control engine 2 may also comprise, or may be in communication with, computer storage media, such as, without limitation, the memory 5, capable of storing computer program instructions or software code that, when executed by the processor, causes the processor to perform the elements described herein. In addition, the memory 5 may be any type of data storage computer storage medium, capable of storing a data structure representing a computer network to which the apparatus 1 belongs, coupled to the control engine 2 and operable with the data communication engine 4 and the video compression engine 3 to facilitate management and processing of video data stored in association therewith.

In embodiments of the present subject disclosure, the apparatus 1 is configured for performing the image processing methods described herein.

It will be appreciated that the apparatus 1 shown and described with reference to FIG. 8 is provided by way of example only. Numerous other architectures, operating environments, and configurations are possible. Other embodiments of the node may include fewer or greater number of components, and may incorporate some or all of the functionality described with respect to the apparatus components shown in FIG. 8. Accordingly, although the control engine 2, video compression engine 3, data communication engine 4, and memory 5 are illustrated as part of the apparatus 1, no restrictions are placed on the location and control of components 2-5. In particular, in other embodiments, components 2-5 may be part of different entities or computing systems.

The proposed method may be used for the processing, for purposes of encoding or compression of input data which may correspond, depending on the embodiment, to an image, a picture, a video frame, or video data.

Although this subject disclosure has been disclosed in the context of certain preferred embodiments, it should be understood that certain advantages, features and aspects of the systems, devices, and methods may be realized in a variety of other embodiments. Additionally, it is contemplated that various aspects and features described herein can be practiced separately, combined together, or substituted for one another, and that a variety of combination and sub-combinations of the features and aspects can be made and still fall within the scope of the present subject disclosure. Furthermore, the systems and devices described above need not include all of the modules and functions described in the preferred embodiments.

Information and signals described herein can be represented using any of a variety of different technologies and techniques. For example, data, instructions, commands, information, signals, bits, symbols, and chips can be represented by voltages, currents, electromagnetic waves, magnetic fields or particles, optical fields or particles, or any combination thereof.

Depending on the embodiment, certain acts, events, or functions of any of the methods described herein can be performed in a different sequence, may be added, merged, or left out altogether (e.g., not all described acts or events are necessary for the practice of the method). Moreover, in certain embodiments, acts or events may be performed concurrently rather than sequentially.

The invention claimed is:

1. A method of processing an image, wherein the image is divided into a plurality of blocks, the method comprising, for a block of the plurality of blocks:
    determining prediction residual data representing prediction encoding data for pixels of the block;
    determining coefficients based on the prediction residual data, wherein the determining of the coefficients comprises: determine first transform coefficients by applying a first transform to the prediction residual data;
    based on a number of non-null coefficients among the coefficients, the number of non-null coefficients being at least one, determining a processing to be performed on the prediction residual data for generating a binary flow of encoded pixels of the block, wherein the determining the processing comprises: based on a first number of non-null transform coefficients among the first transform coefficients being at least one, select a transform to be performed on the prediction residual data for generating a binary flow of encoded pixels of the block,
    wherein the method further comprises:
    performing at least one iteration of a transform test loop, an Nth iteration of the transform test loop comprising, N being a transform test loop counter initialized to one;
    determining Nth test loop transform coefficients by applying a Nth test loop transform to the prediction residual data;
    wherein the transform to be used for generating a binary flow of encoded pixels of the block is further based on a Nth number of non-null test loop transform coefficients among the Nth test loop transform coefficients, the Nth number of non-null test loop transform coefficients being at least one, and
    wherein the Nth transform is of a type different from a type of the first transform and a type of the ith transform used during any previous iteration of the transform test loop.

2. The method according to claim 1, further comprising:
    determining image processing context data based on a context for processing the image;
    determining a threshold based on the image processing context data;
    wherein the processing is determined based on a comparison of the number of non-null coefficients with the threshold.

3. The method according to claim 1, further comprising: based on the first number of non-null transform coefficients being smaller than a first transform coefficient threshold, using the first transform coefficients for generating transformed prediction residual data.

4. The method according to claim 3, further comprising: based on the first number of non-null transform coefficients being greater than or equal to the first transform coefficient threshold and smaller than a second transform coefficient threshold, testing transforms in a predefined first set of transforms, and selecting the transform to be performed on the prediction residual data for generating a binary flow of encoded pixels of the block among the first transform and transforms of the first set of transforms.

5. The method according to claim 3, further comprising: based on the first number of non-null transform coefficients being greater than a third transform coefficient threshold, testing transforms in a predefined second set of transforms, and selecting the transform to be performed on the prediction residual data for generating a binary flow of encoded pixels of the block among the first transform and transforms of the second set of transforms, wherein the second set of transforms comprises an identity transform.

6. The method according to claim 1, further comprising: based on each of the first number of the non-null coefficients and the $N^{th}$ number of the non-null test loop transform coefficients being smaller than the first transform coefficient threshold, selecting the transform to be performed on the prediction residual data for generating a binary flow of encoded pixels of the block in a set of tested transforms comprising the first transform and transforms used during executed iterations of the transform test loop.

7. The method according to claim 1, further comprising: based on each of the first number of the non-null coefficients and the Nth number of the non-null test loop transform coefficients not being smaller than the first transform coefficient threshold, performing an additional iteration of the transform test loop.

8. The method according to claim 1, wherein the first transform is a bi-dimensional Direct Cosine Transform (DCT) transform.

9. An image processing apparatus comprising a processor, and a memory operatively coupled to the processor, wherein the image processing apparatus is configured to perform a method of processing an image, wherein the image is divided into a plurality of blocks, the method comprising, for a block of the plurality of blocks:
    determining prediction residual data representing prediction encoding data for pixels of the block;
    determining coefficients based on the prediction residual data, wherein the determining of the coefficients comprises: determine first transform coefficients by applying a first transform to the prediction residual data;
based on a number of non-null coefficients among the coefficients, the number of non-null coefficients being at least one, determining a processing to be performed on the prediction residual data for generating a binary flow of encoded pixels of the block, wherein the determining the processing comprises: based on a first number of non-null transform coefficients among the first transform coefficients being at least one, select a transform to be performed on the prediction residual data for generating a binary flow of encoded pixels of the block,
wherein the method further comprises:
performing at least one iteration of a transform test loop, a Nth iteration of the transform test loop comprising, N being a transform test loop counter initialized to one;
determining Nth test loop transform coefficients by applying a Nth test loop transform to the prediction residual data;
wherein the transform to be used for generating a binary flow of encoded pixels of the block is further based on a Nth number of non-null test loop transform coefficients among the Nth test loop transform coefficients, the Nth number of non-null test loop transform coefficients being at least one, and
wherein the Nth transform is of a type different from a type of the first transform and a type of the ith transform used during any previous iteration of the transform test loop.

10. The image processing apparatus according to claim 9, wherein the method further comprises:
determining image processing context data based on a context for processing the image;
determining a threshold based on the image processing context data;
wherein the processing is determined based on a comparison of the number of non-null coefficients with the threshold.

11. The image processing apparatus according to claim 9, wherein the method further comprises: based on the first number of non-null transform coefficients being smaller than a first transform coefficient threshold, use the first transform coefficients for generating transformed prediction residual data.

12. The image processing apparatus according to claim 11, wherein the method further comprises: based on the first number of non-null transform coefficients being greater than or equal to the first transform coefficient threshold and smaller than a second transform coefficient threshold, test transforms in a predefined first set of transforms, and select the transform to be performed on the prediction residual data for generating a binary flow of encoded pixels of the block among the first transform and transforms of the first set of transforms.

13. The image processing apparatus according to claim 11, wherein the method further comprises: based on the first number of non-null transform coefficients being greater than a third transform coefficient threshold, test transforms in a predefined second set of transforms, and select the transform to be performed on the prediction residual data for generating a binary flow of encoded pixels of the block among the first transform and transforms of the second set of transforms, wherein the second set of transforms comprise an identity transform.

14. The image processing apparatus according to claim 11, wherein the method further comprises:
based on each of the first number of the non-null coefficients and the Nth number of the non-null test loop transform coefficients being smaller than the first transform coefficient threshold, select the transform to be performed on the prediction residual data for generating a binary flow of encoded pixels of the block in a set of tested transforms comprising the first transform and transforms used during executed iterations of the transform test loop.

15. A non-transitory computer-readable medium encoded with executable instructions which, when executed, causes an apparatus comprising a processor operatively coupled with a memory, to perform a method of processing an image, wherein the image is divided into a plurality of blocks, the method comprising, for a block of the plurality of blocks:
determining prediction residual data representing prediction encoding data for pixels of the block;
determining coefficients based on the prediction residual data, wherein the determining of the coefficients comprises: determine first transform coefficients by applying a first transform to the prediction residual data;
based on a number of non-null coefficients among the coefficients, the number of non-null coefficients being at least one, determining a processing to be performed on the prediction residual data for generating a binary flow of encoded pixels of the block, wherein the determining the processing comprises: based on a first number of non-null transform coefficients among the first transform coefficients being at least one, select a transform to be performed on the prediction residual data for generating a binary flow of encoded pixels of the block,
wherein the method further comprises:
performing at least one iteration of a transform test loop, a Nth iteration of the transform test loop comprising, N being a transform test loop counter initialized to one;
determining Nth test loop transform coefficients by applying a Nth test loop transform to the prediction residual data;
wherein the transform to be used for generating a binary flow of encoded pixels of the block is further based on a Nth number of non-null test loop transform coefficients among the Nth test loop transform coefficients, the Nth number of non-null test loop transform coefficients being at least one, and
wherein the Nth transform is of a type different from a type of the first transform and a type of the ith transform used during any previous iteration of the transform test loop.

16. The non-transitory computer-readable medium according to claim 15, wherein the method further comprises:
determining image processing context data based on a context for processing the image;
determining a threshold based on the image processing context data;
wherein the processing is determined based on a comparison of the number of non-null coefficients with the threshold.

17. The non-transitory computer-readable medium according to claim 15, wherein the method further comprises: based on the first number of non-null transform coefficients being smaller than a first transform coefficient threshold, use the first transform coefficients for generating transformed prediction residual data.

18. The non-transitory computer-readable medium according to claim 17, wherein the method further comprises: based on the first number of non-null transform coefficients being greater than or equal to the first transform coefficient threshold and smaller than a second transform coefficient threshold, test transforms in a predefined first set of transforms, and select the transform to be performed on the prediction residual data for generating a binary flow of encoded pixels of the block among the first transform and transforms of the first set of transforms.

19. The non-transitory computer-readable medium according to claim 17, wherein the method further comprises: based on the first number of non-null transform coefficients being greater than a third transform coefficient threshold, test transforms in a predefined second set of transforms, and select the transform to be performed on the prediction residual data for generating a binary flow of encoded pixels of the block among the first transform and transforms of the second set of transforms, wherein the second set of transforms comprise an identity transform.

20. The non-transitory computer-readable medium according to claim 17, wherein the method further comprises: based on each of the first number of the non-null coefficients and the Nth number of the non-null test loop transform coefficients being smaller than the first transform coefficient threshold, select the transform to be performed on the prediction residual data for generating a binary flow of encoded pixels of the block in a set of tested transforms comprising the first transform and transforms used during executed iterations of the transform test loop.

\* \* \* \* \*